(12) United States Patent
Hayashi et al.

(10) Patent No.: US 12,195,028 B2
(45) Date of Patent: Jan. 14, 2025

(54) INFORMATION PRESENTATION CONTROL DEVICE AND FUNCTION CONTROL DEVICE

(71) Applicant: DENSO CORPORATION, Kariya (JP)

(72) Inventors: Akihiro Hayashi, Kariya (JP); Takuya Kume, Kariya (JP); Yukari Itou, Kariya (JP); Kazuki Kojima, Kariya (JP); Shiori Maneyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 141 days.

(21) Appl. No.: 17/945,371

(22) Filed: Sep. 15, 2022

(65) Prior Publication Data

US 2023/0001948 A1 Jan. 5, 2023

Related U.S. Application Data

(63) Continuation of application No. PCT/JP2021/009885, filed on Mar. 11, 2021.

(30) Foreign Application Priority Data

Mar. 23, 2020 (JP) .................................. 2020-051518
Feb. 26, 2021 (JP) .................................. 2021-030063

(51) Int. Cl.
*B60W 50/14* (2020.01)
*B60K 35/00* (2024.01)
(Continued)

(52) U.S. Cl.
CPC .............. *B60W 50/14* (2013.01); *B60K 35/00* (2013.01); *B60W 40/072* (2013.01);
(Continued)

(58) Field of Classification Search
CPC ....... B60K 2360/175; B60K 2360/197; B60W 60/005; B60W 2540/223
See application file for complete search history.

(56) References Cited

U.S. PATENT DOCUMENTS

2004/0209594 A1* 10/2004 Naboulsi ............. B60R 11/0264
455/403
2017/0334451 A1 11/2017 Asakura et al.
(Continued)

FOREIGN PATENT DOCUMENTS

JP 2015133050 A 7/2015
JP 2015217798 A 12/2015
(Continued)

*Primary Examiner* — Thomas S McCormack
(74) *Attorney, Agent, or Firm* — Harness, Dickey & Pierce, P.L.C.

(57) ABSTRACT

A human machine interface control unit as an information presentation control device is used in a vehicle having an autonomous driving function to perform a driving action on behalf of a driver, and controls an information presentation device configured to present information to the driver. The human machine interface control unit includes a permissible action determination unit configured to determine a permissible action that a driver is permitted to take among actions, other than a driving action, to be possibly taken by the driver when the autonomous driving function is implemented, and an information presentation content control unit configured to cause an information presentation device to present information related to a determination result of the permissible action.

40 Claims, 14 Drawing Sheets

(51) Int. Cl.
  *B60K 35/28*    (2024.01)
  *B60K 35/29*    (2024.01)
  *B60W 40/072*   (2012.01)
  *B60W 40/08*    (2012.01)
  *B60W 60/00*    (2020.01)

(52) U.S. Cl.
  CPC .......... *B60W 40/08* (2013.01); *B60W 60/001* (2020.02); *B60K 35/28* (2024.01); *B60K 35/29* (2024.01); *B60K 2360/161* (2024.01); *B60K 2360/172* (2024.01); *B60K 2360/195* (2024.01); *B60W 2040/0827* (2013.01); *B60W 2050/143* (2013.01); *B60W 2050/146* (2013.01); *B60W 2540/22* (2013.01); *B60W 2540/223* (2020.02); *B60W 2540/229* (2020.02); *B60W 2552/30* (2020.02)

(56) References Cited

U.S. PATENT DOCUMENTS

| | | |
|---|---|---|
| 2018/0299889 A1 | 10/2018 | Yokota |
| 2021/0016805 A1* | 1/2021 | Oba .......................... A61B 5/18 |
| 2021/0046852 A1* | 2/2021 | Ushiro .................. B60R 16/037 |
| 2021/0146962 A1 | 5/2021 | Kaji et al. |

FOREIGN PATENT DOCUMENTS

| | | |
|---|---|---|
| JP | 2017207859 A | 11/2017 |
| JP | 2017222271 A | 12/2017 |
| JP | 2018177064 A | 11/2018 |
| JP | 2019064539 A | 4/2019 |
| JP | 2019124554 A | 7/2019 |
| WO | WO-2018220826 A1 | 12/2018 |

\* cited by examiner

INFORMATION PRESENTATION CONTROL DEVICE AND FUNCTION CONTROL DEVICE

CROSS REFERENCE TO RELATED APPLICATION

The present application is a continuation application of International Patent Application No. PCT/JP2021/009885 filed on Mar. 11, 2021, which designated the U.S. and claims the benefit of priority from Japanese Patent Applications No. 2020-051518 filed on Mar. 23, 2020 and No. 2021-030063 filed on Feb. 26, 2021. The entire disclosures of all of the above applications are incorporated herein by reference.

TECHNICAL FIELD

The present disclosure relates to an information presentation control device and a function control device.

BACKGROUND

Conventionally, a vehicle having an autonomous driving function has been known.

SUMMARY

According to an aspect of the present disclosure, an information presentation control device is for a vehicle having an autonomous driving function.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
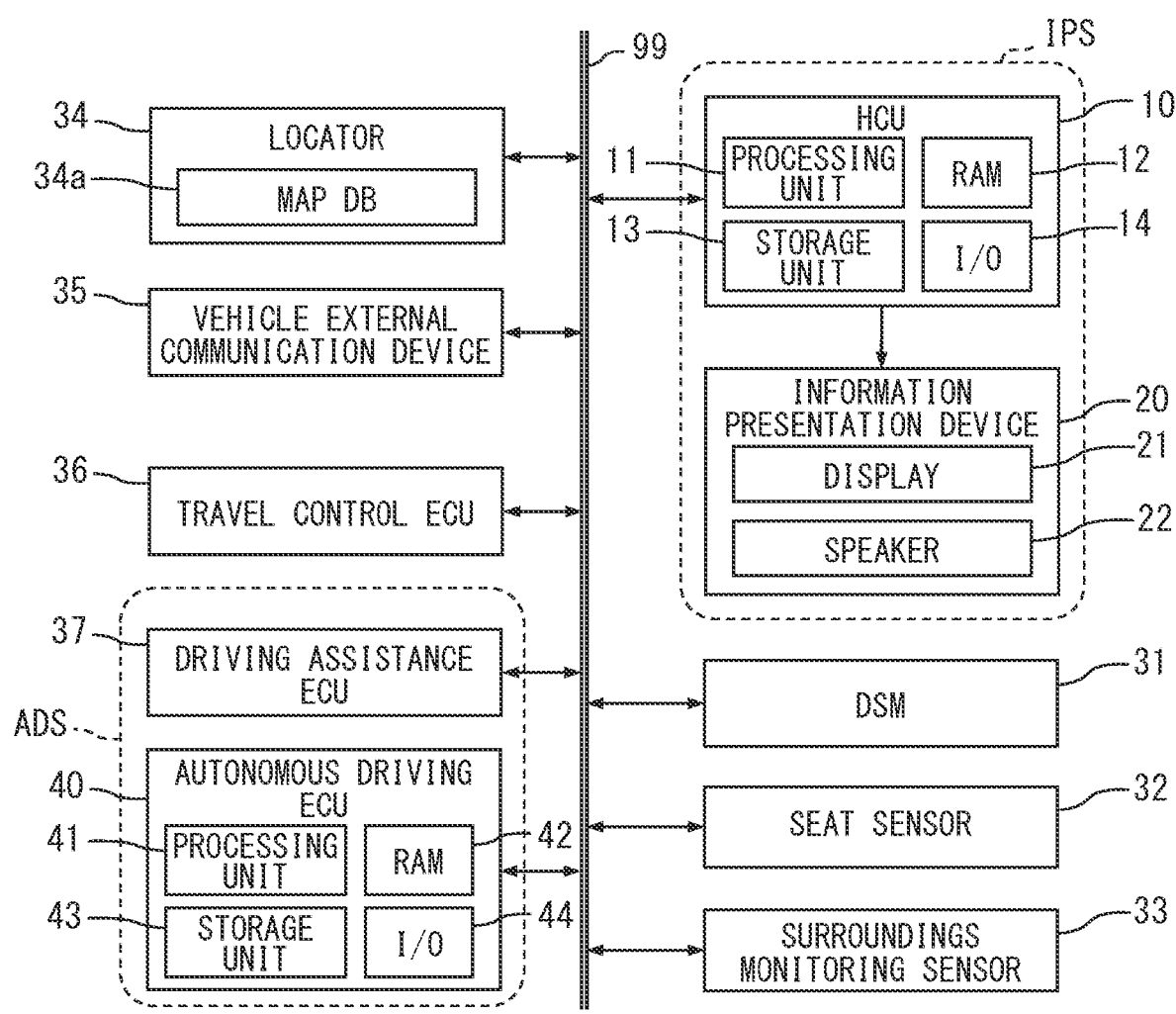
FIG. 1 is a diagram illustrating an overall image of an in-vehicle network.

Hereinafter, examples of the present disclosure will be described.

According to an example of the present disclosure, an application image is displayed on an information presentation device when it is determined that an autonomous driving function is being implemented in a vehicle having the autonomous driving function capable of performing a driving action on behalf of a driver.

When the autonomous driving function is implemented, the driver of the vehicle can view and operate the above-described application image as an action other than driving.

On the other hand, when the autonomous driving function is implemented, there may be an action to be permitted and an action not to be permitted among actions other than driving. Furthermore, the permissible range of such an action may change according to various situations, for example, the travel environment of the vehicle, the state of the driver, and the like. It may be difficult for the driver to accurately recognize various situations and accurately determine what actions other than driving are permitted.

According to an aspect of the present disclosure, an information presentation control device is for a vehicle. The vehicle has an autonomous driving function to perform a driving action on behalf of a driver and configured to control an information presentation device that is configured to present information to the driver. The information presentation control device comprises a permissible action determination unit configured to determine a permissible action, which is permitted for the driver, among actions other than driving, different from the driving action, and to be possibly taken by the driver when the autonomous driving function is implemented. The information presentation control device further comprises an information presentation content control unit configured to cause the information presentation device to present information about a determination result of the permissible action.

According to such an aspect, information about the determination result of the permissible action determined by the permissible action determination unit is presented by the information presentation device. At the time of operation of the autonomous driving function in which the necessity of grasping the situation such as the travel environment of the vehicle is reduced for the driver, the driver can obtain information about the determination result of the permissible action via the information presentation device. Therefore, by referring to such information, the driver can easily take an appropriate action when the autonomous driving function is implemented.

Further, an aspect disclosed herein is a function control device that is used in a vehicle having an autonomous driving function capable of performing a driving action on behalf of a driver and controls a function of a device to be controlled, where the function control device includes a permissible action determination unit that determines a permissible action, which is permitted for the driver, among actions, which are other than driving, different from the driving action, and to be possibly taken by the driver when the autonomous driving function is implemented, and a function restriction unit that restricts a function of the device to be controlled capable of implementing an action other than the permissible action among the actions other than driving.

According to such an aspect, the function of the device to be controlled capable of implementing an action other than the permissible action among the actions other than driving is restricted based on the permissible action determined by the permissible action determination unit. A situation in which the driver inadvertently takes an action other than the permissible action at the time of operation of the autonomous driving function in which the necessity of grasping the situation such as the travel environment of the vehicle is reduced for the driver is suppressed by the functional restriction. Therefore, the driver can easily take an appropriate action when the autonomous driving function is implemented.

Hereinafter, a plurality of embodiments will be described with reference to the drawings. The same reference numerals are given to corresponding components in each embodiment, and redundant description may be omitted. When only part of the configuration is described in each embodiment, the configuration of the other embodiment described above can be applied to other parts of the configuration. In addition, not only a combination of configurations explicitly described in the description of each embodiment but also configurations of a plurality of embodiments can be partially combined even when not explicitly described as long as there is no problem in the combination.

First Embodiment

As illustrated in FIG. 1, an information presentation control device according to a first embodiment of the present disclosure is a human machine interface control unit (HCU) 10. The HCU 10 together with an information presentation device 20 and the like constitutes an information presentation system IPS. The HCU 10 is an electronic control device that controls the information presentation device 20, and realize an information presentation function, an action execution assistance function that assists execution of an action, other than driving, such as a second task, and the like in a combined manner. The HCU 10 is used in a vehicle 1, and is mounted on the vehicle 1, for example.

The HCU 10 is communicably connected to a communication bus 99 of an in-vehicle network mounted on the vehicle 1. The HCU 10 is one of a plurality of nodes provided in an in-vehicle network mounted on the vehicle 1. A DSM 31, a seat sensor 32, a surroundings monitoring sensor 33, a locator 34, a vehicle external communication device 35, a travel control ECU 36, a driving assistance ECU 37, an autonomous driving ECU 40, and the like are connected as nodes to the communication bus 99 of the in-vehicle network.

A driver status monitor (DSM) 31 is a state detection device that detects a state of a driver. The DSM 31 includes a near-infrared light source, a near-infrared camera, and a control unit that controls the near-infrared light source and the near-infrared camera. The DSM 31 is installed, for example, on an upper face of a steering column portion, an upper face of an instrument panel, or the like in a posture in which a near-infrared camera faces a headrest portion of a driver seat. The DSM 31 images the head of the driver irradiated with the near-infrared light by the near-infrared light source with the near-infrared camera. The image captured by the near-infrared camera is subjected to an image analysis by the control unit. The control unit extracts, from the captured image, state information such as the position of the eye point of the driver, the line-of-sight direction, the deflection of the pupil, and the posture of the driver, and provides the extracted state information about the driver to the HCU 10 and the like through the communication bus 99. Alternatively, the control unit can provide the captured image itself to the HCU 10 or the like through the communication bus 99.

The seat sensor 32 is a sensor that detects a seated state of the driver on the driver seat. The seat sensor 32 has a function of detecting whether the driver is seated on the driver seat, a function of detecting whether the driver wears a seat belt, a function of detecting a reclining angle of the driver seat, and the like. The seat sensor 32 provides information about the seated state to the HCU 10 and the like through the communication bus 99.

The surroundings monitoring sensor 33 is an autonomous sensor that monitors the surrounding environment of the vehicle 1. The surroundings monitoring sensor 33 can detect a moving object such as a pedestrian, a cyclist, an animal other than a human, and another vehicle, an object that has fallen on a road, a guard rail, a curbstone, a road sign, a road marking such as a traveling section line, and a stationary object such as a structure on a road side from a detection range around the host vehicle. The surroundings monitoring sensor 33 provides detection information about an object around the host vehicle to the driving assistance ECU 37, the autonomous driving ECU 40, the HCU 10, and the like through the communication bus 99.

The surroundings monitoring sensor 33 includes, for example, a camera unit and a millimeter wave radar. The camera unit may include a monocular camera or a compound-eye camera. The camera unit is mounted on the vehicle 1 so as to be capable of imaging a range in front of, a range side of, a range behind, and the like of the vehicle 1. The camera unit outputs at least one of imaging data obtained by imaging the surroundings of the host vehicle and an analysis result of the imaging data as detection information. The millimeter wave radar radiates a millimeter wave or a quasi-millimeter wave toward the surroundings of the host vehicle. The millimeter wave radar outputs detection information generated by the process of receiving a reflected wave reflected by a moving object, a stationary object, or the like. The surroundings monitoring sensor 33 may include a lidar, a sonar, and the like in a form of being added to or replaced with the camera unit and the millimeter wave radar.

The locator 34 includes a global navigation satellite systems (GNSS) receiver, an inertial sensor, and the like. The locator 34 combines a positioning signal received by the GNSS receiver, a measurement result of the inertial sensor, vehicle speed information output to the communication bus 99, and the like, to sequentially position the vehicle position, the traveling direction, and the like of the vehicle 1. The locator 34 sequentially outputs the location information and the direction information about the vehicle 1 based on the positioning result to the communication bus 99 as locator information.

The locator 34 further includes a map database 34a. The map database 34a mainly includes a large-capacity nonvolatile storage medium storing a large number of pieces of three-dimensional map data and two-dimensional map data. The three-dimensional map data is so-called high-precision map data, and includes information necessary for advanced driving assistance and autonomous driving, such as three-dimensional shape information about a road and detailed information about each lane. The locator 34 reads map data around the current position from the map database 34a, and provides the map data together with locator information to the driving assistance ECU 37, the autonomous driving ECU 40, and the like. Instead of the locator 34, a user terminal such as a smartphone, a navigation device, or the like may provide the location information, the direction information, the map data, and the like to the driving assistance ECU 37 and the autonomous driving ECU 40.

The vehicle external communication device 35 is a communication module (Data Communication Module) mounted on the vehicle 1. The vehicle external communication device 35 transmits and receives radio waves between the vehicle 1 and a surrounding base station by wireless communication conforming to a communication standard such as long term evolution (LTE) and 5G. By mounting the vehicle external communication device 35, the vehicle 1 is a connected car connected to the Internet. The vehicle external communication device 35 acquires various pieces of data from a probe server provided on a cloud. Examples of the various pieces of data include latest map data of a road on which the vehicle 1 travels, data of traffic information, data of weather information, replay data of a content such as a movie to be replayed by the information presentation device 20, and the like. The data of the traffic information includes, for example, traffic volume of a road on which the vehicle 1 travels, road information such as traffic restrictions due to traffic accidents and constructions, and the like.

The travel control ECU 36 is an electronic control device mainly including a microcomputer. The travel control ECU 36 generates vehicle speed information indicating a current traveling speed of the vehicle 1 based on a detection signal of a wheel speed sensor provided in a hub portion of each wheel, and sequentially outputs the vehicle speed information to the communication bus 99. In addition, the travel control ECU 36 controls the operation of the driving actuator.

The driving actuator includes a vehicle steering device, a vehicle drive device, and a vehicle braking device for performing a driving operation. The driving operation includes vehicle steering, vehicle driving, and vehicle braking. The vehicle steering device is a device that controls a steering angle given to, for example, the front wheel of the vehicle 1. The vehicle drive device is a device that drives, for example, a front wheel of the vehicle 1 using power provided from a power source of the vehicle 1. The vehicle braking device is a device that brakes, for example, the front wheel of the vehicle 1 by a braking method such as friction braking or regenerative braking.

The driving assistance ECU 37 and the autonomous driving ECU 40 constitute an autonomous driving system ADS in the vehicle 1. By mounting the autonomous driving system ADS, the vehicle 1 has an autonomous driving function.

The driving assistance ECU 37 is an electronic control device that implements a driving assistance function of assisting the driving operation of the driver. The driving assistance ECU 37 enables advanced driving assistance of about level 2 at the autonomous driving level or partial autonomous travel control. The driving assistance ECU 37 mainly includes a computer including a processing unit, a random access memory (RAM), a storage unit, an input/output interface, a bus connecting these, and the like. The driving assistance ECU 37 has a plurality of function units that implements advanced driving assistance by executing a computer program by a processing unit and outputting a control signal to the travel control ECU 36. Specifically, the driving assistance ECU 37 includes an adaptive cruise control (ACC) function unit that implements an ACC function, and a lane tracing assist (LTA) function unit that implements an LTA function. Further, the driving assistance ECU 37 includes an LCA function unit or the like that implements a lane change assist (LCA) function.

The autonomous driving ECU 40 is an electronic control device that implements an autonomous driving function capable of substituting for a driving operation of a driver. The autonomous driving ECU 40 enables the system of the vehicle 1 to autonomously travel at level 3 as a control subject only in a preset restricted operation design area (Operational Design Domain, hereinafter restricted area).

Here, the restricted area includes a travel environmental condition which is a premise for normally operating the autonomous traveling by the autonomous driving ECU 40. As an example, the restricted area may be set based on the road traffic laws and regulations of the country and region where the vehicle 1 travels, and may be set based on technical restrictions caused by the infrastructure maintenance state of the road on which the vehicle 1 travels, the road shape, and the like. The classification of the restricted area based on the road condition, the geographical condition, and the like described above is included in the information about the map database 34a, for example, in association with the above-described map data.

The autonomous driving ECU 40 mainly includes a computer including a processing unit 41, a RAM 42, a storage unit 43, an input/output interface 44, a bus connecting these, and the like. The processing unit 41 is hardware for arithmetic processing coupled to the RAM 42. The processing unit 41 includes at least one of the arithmetic cores such as a central processing unit (CPU) and a graphic processing unit (GPU). The processing unit 41 may further include a reduced instruction set computer (RISC), a field-programmable gate array (FPGA), an IP core having another dedicated function, and the like. The processing unit 41 executes various processes for implementing the functions of the function units described later by accessing the RAM 42. The storage unit 43 includes at least one non-volatile storage medium such as a semiconductor memory, for example. The storage unit 43 stores various computer programs (for example, autonomous driving programs) executed by the processing unit 41.

Figure 2:
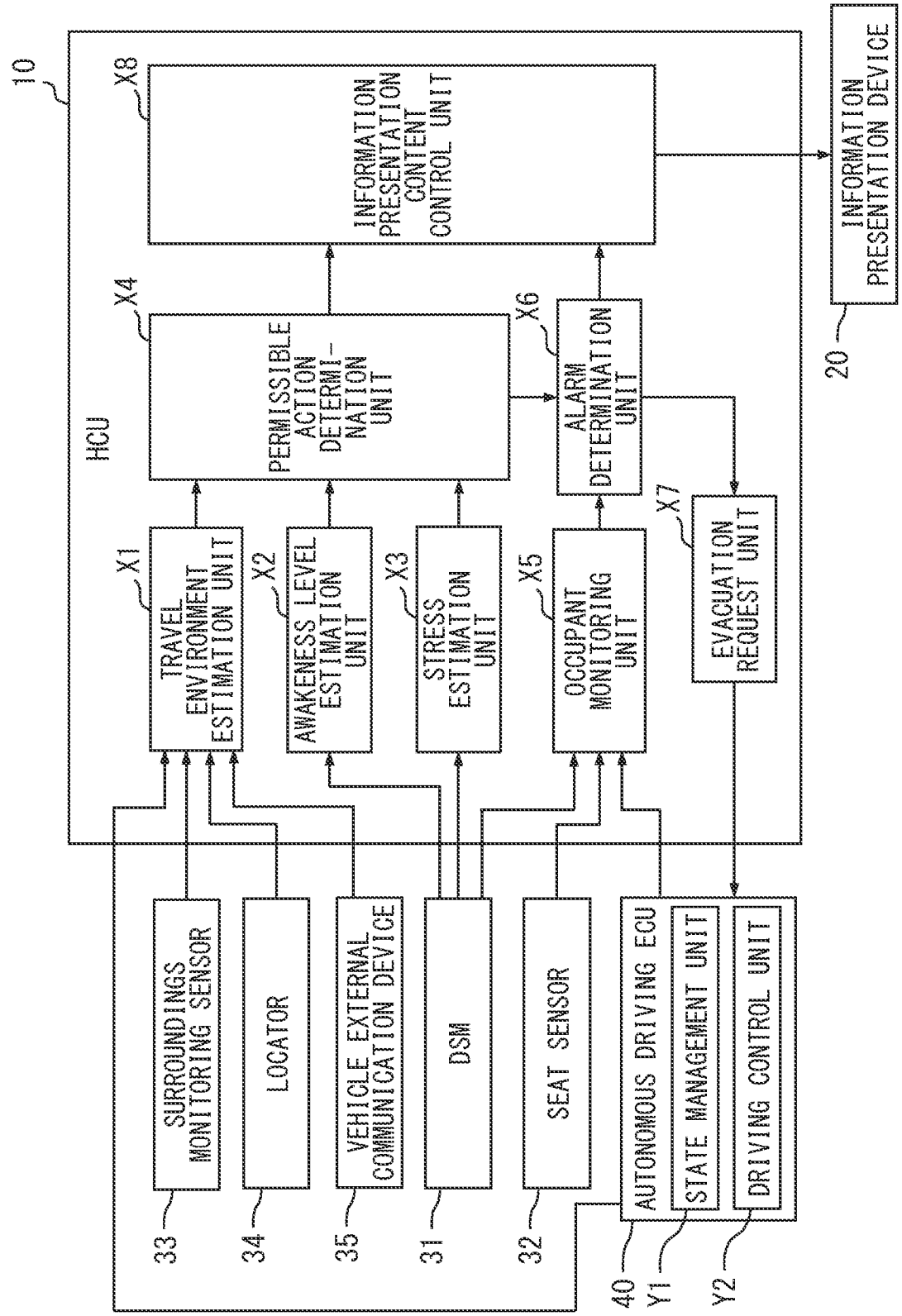
FIG. 2 is a diagram illustrating a schematic configuration of an HCU.

The autonomous driving ECU 40 has a plurality of function units that realizes autonomous driving by executing a computer program stored in the storage unit 43 by the processing unit 41. Specifically, as illustrated in FIG. 2, the autonomous driving ECU 40 includes a state management unit Y1 and a driving control unit Y2.

The state management unit Y1 manages the state of autonomous driving based on locator information and map information acquired from the locator 34, detection information acquired from the surroundings monitoring sensor 33, traffic information and weather information acquired through the vehicle external communication device 35, an evacuation request from the HCU 10, and the like. Specifically, the state management unit Y1 of the first embodiment manages the autonomous driving level as the state of the autonomous driving and switches the autonomous driving level at an appropriate time. In the first embodiment, the autonomous driving level takes a discrete numerical value that is an integer of 0 to 3. The autonomous driving level means that the range in which the system is the control subject in the driving action increases as the numerical value increases. Here, the driving action is defined as a concept obtained by adding surroundings monitoring to the driving operation described above. The autonomous driving level switched by the state management unit Y1 conforms to the autonomous driving level defined by the American Society of Automotive Engineers.

For example, in a case where the autonomous driving level is level 0, the driver is the implementation entity for all driving actions. So-called manual driving is performed. In a case where the autonomous driving level is level 1, among the driving actions, the implementation entity of one of the vehicle steering, the vehicle driving, and the vehicle braking is the vehicle 1 (specifically, the driving assistance ECU 37), and the implementation entity of all the other driving actions is the driver. When the autonomous driving level is level 2, the implementation entity of the driving operations of vehicle steering, vehicle driving, and vehicle braking is the vehicle 1 (specifically, driving assistance ECU 37). In this case, it is necessary for the driver to be an implementation entity of the surroundings monitoring, monitor the execution status of the driving operation by the vehicle 1, and maintain a state in which the driver can perform the immediate driving operation such as gripping the steering wheel so as to intervene in the driving operation at any time.

When the autonomous driving level is level 3, the implementation entity of all driving actions of vehicle steering, vehicle driving, vehicle braking, and surroundings monitoring is the vehicle 1, and the autonomous driving ECU 40 of the vehicle 1 performs these driving actions. At this time, the driver can perform an action, other than driving, different from driving within a range permitted for safety without constantly monitoring the execution status of the driving action by the autonomous driving ECU 40. The range permitted for safety may be legally defined or may be defined based on safety in actual driving.

Actions, other than driving, that can be taken by the driver include viewing a content, a computer game, browsing and sending an e-mail, browsing a website, operating a mobile phone or a smartphone, eating, makeup (makeup), reading, sleeping, and the like. The content includes, for example, a moving image such as a movie, music, an audio book, and the like. These are sometimes referred to as a second task, a secondary task, a secondary activity, and other activities. However, these reference may indicate an action itself other than driving, may indicate an action generally permitted for safety among actions other than driving, or may indicate an action individually and specifically permitted for safety according to various situations among actions other than driving. Hereinafter, among actions other than driving, an action individually and specifically permitted for safety according to various situations is defined as a permissible action, and the description will be continued. The range recognized as the permissible action may vary depending on a temporal change in various situations.

The state management unit Y1 switches the autonomous driving level in a timely manner. When the autonomous driving level is level 0, the driving assistance ECU 37 and the autonomous driving ECU 40 do not substantially intervene in the driving action, and the travel control ECU 36 and the driving actuator are directly controlled by the driving action of the driver. When the autonomous driving level is level 1 or 2, the travel control ECU 36 and the driving actuator are controlled in a mode in which the driving assistance ECU 37 assists the driving action of the driver. When the autonomous driving level is level 3, the travel control ECU 36 and the driving actuator are controlled based on the calculation of the autonomous driving ECU 40.

When vehicle 1 travels in the above-described restricted area, the state management unit Y1 sets the upper limit of the autonomous driving level to level 3. Conversely, when the vehicle 1 travels outside the restricted area, the state management unit Y1 basically sets the upper limit of the autonomous driving level to level 2, and sets the upper limit of the autonomous driving level to level 3 under the exceptional condition. This exceptional condition is, for example, a condition that a road on which the vehicle 1 travels is congested and the vehicle 1 travels at a low speed less than a predetermined speed. From the above, the restricted area indicated by the map database 34a and the congestion section in which the vehicle travels at low speed are permitted areas for at least some of the second tasks.

Even when the vehicle 1 travels in the restricted area, the state management unit Y1 may lower the autonomous driving level from level 3 to level 2 or less. For example, when the autonomous driving function deviates from the use condition or is predicted to deviate from the use condition, the state management unit Y1 suddenly lowers the autonomous driving level to level 2 or less. For example, in a case where the detection accuracy of the surroundings monitoring sensor 33 is lowered due to deterioration of environmental conditions due to bad weather such as heavy rain, snowfall, dense fog, and sandstorm, it may deviate from the use condition serving as a premise of the operation of the autonomous driving function. When a traffic accident occurs around the host vehicle, the autonomous driving function may deviate from the use condition.

In a case where the state management unit Y1 determines to lower the autonomous driving level from level 3 to level 2 or lower due to the end schedule of the permitted area or deviation from the use condition, the state management unit Y1 requests of the HCU 10 that the information presentation device 20 presents information for giving notice of the driving-mode switch to the driver. When the driver responds to the driving-mode switch, the state management unit Y1 actually lowers the autonomous driving level from level 3 to level 2 or lower. When the driver does not respond to the driving-mode switch even after waiting for a predetermined time after the notice of the driving-mode switch, the state management unit Y1 can determine to perform the minimal risk manoeuvre (MRM) control on the vehicle 1. The MRM control is vehicle control in which a risk is minimized in an emergency, and specifically means control of searching for and setting an evacuation place and moving and stopping the host vehicle to the evacuation place.

When the state management unit Y1 sets the autonomous driving level to level 3, the driving control unit Y2 functions as an implementation entity of a driving action and controls the travel control ECU 36. Specifically, the driving control unit Y2 recognizes a road shape on which the vehicle 1 travels, a position of another vehicle, and the like based on locator information and map information acquired from the locator 34, detection information acquired from the surroundings monitoring sensor 33, and the like. The driving control unit Y2 generates a planned traveling line on which the vehicle 1 travels based on the recognition result of the road shape, the position of another vehicle, and the like. The driving control unit Y2 causes the vehicle 1 to travel along the generated planned traveling line in cooperation with the travel control ECU 36.

When the above-described MRM control is performed, the driving control unit Y2 gradually decrease the traveling speed of the vehicle 1 while causing the vehicle 1 to issue an alarm such as a siren around the host vehicle, and causes the vehicle 1 to stop at a relatively safe place such as a side of a road.

Next, details of each of the information presentation device 20 and the HCU 10 included in the information presentation system IPS will be sequentially described.

The information presentation device 20 is a device that presents information to a driver. As illustrated in FIG. 1, information presentation device 20 includes a plurality of displays 21 and a plurality of speakers 22. The plurality of displays 21 is installed on, for example, an instrument panel. The plurality of displays 21 include, for example, a graphic meter, a center information display (CID), and the like. Further, a head-up display (HUD) may be included in the display 21. Each display 21 is a device that presents visual information to the driver, and is configured to be capable of displaying an image. At least some displays (for example, CIDs) of the plurality of displays 21 have a display function and an operation function of receiving a touch operation or the like in a complex manner.

The plurality of speakers 22 is disposed, for example, in the vicinity of a display screen in an instrument panel, in a door panel, in a rear quarter panel, or the like. Each speaker 22 is a device that presents auditory information to the driver. Specifically, each speaker 22 can emit sound by converting an input electrical signal into a physical signal using a voice coil and a diaphragm. The speaker 22 may be provided individually corresponding to each display 21, may be provided in common for some or all of the displays 21, or may be provided completely independently of the display 21.

The HCU 10 is an electronic control device that integrally controls information presentation to an occupant such as a driver in cooperation with the autonomous driving ECU 40 and the information presentation device 20. The HCU 10 mainly includes a computer including, for example, a processing unit 11, a RAM 12, a storage unit 13, an input/output interface 14, and a bus that connects these components. The processing unit 11 is hardware for arithmetic processing coupled to the RAM 12. The processing unit 11 includes at least one of arithmetic cores such as a CPU, a GPU, and a RISC. The processing unit 11 may further include an FPGA, an IP core having another dedicated function, and the like. The RAM 12 may include a video RAM for video generation. The processing unit 11 executes various processes for implementing the functions of the function units described later by accessing the RAM 12. The storage unit 13 includes at least one non-volatile storage medium such as a semiconductor memory, for example. The storage unit 13 stores various computer programs (for example, information presentation programs) executed by the processing unit 11.

The HCU 10 includes a plurality of function units by the processing unit 11 executing a program stored in the storage unit 13. Specifically, as illustrated in FIG. 2, the HCU 10 includes a travel environment estimation unit X1, an awakeness level estimation unit X2, a stress estimation unit X3, a permissible action determination unit X4, an occupant monitoring unit X5, an alarm determination unit X6, an evacuation request unit X7, and an information presentation content control unit X8.

The travel environment estimation unit X1 estimates a travel environment of a road on which the vehicle 1 travels based on detection information acquired from the surroundings monitoring sensor 33, locator information and map data acquired from the locator 34, traffic information acquired through the vehicle external communication device 35, and the like. For the estimation of the travel environment of the road, information such as a road shape and a position of another vehicle recognized by the driving control unit Y2 of the autonomous driving ECU 40, and information about the planned traveling line may be further used.

The travel environment is a concept including a road shape and a traveling scene. The road shape includes a road width, a road slope, a road curvature, a road section line shape, and the like. The traveling scene includes setting of a restricted area, traffic volume, and the like. The travel environment information thus estimated by the travel environment estimation unit X1 is provided to the permissible action determination unit X4. The travel environment estimation unit X1 updates the travel environment information in a timely manner based on the latest information.

The travel environment to be estimated includes a travel environment of a road on which vehicle 1 is currently traveling. In the first embodiment, the travel environment to be estimated further includes a travel environment of a road on which the vehicle 1 is scheduled to travel.

The awakeness level estimation unit X2 estimates the awakeness level of the driver based on the state information about the driver acquired from the DSM 31. The awakeness level of the driver is an index indicating the drowsiness of the driver by a level. The higher the awakeness level, the closer the driver is to the sleep state. The awakeness level takes a discrete numerical value that is an integer between 0 and 3.

For example, in a case where a state where the movement of the line-of-sight of the driver is fast and frequent, a state where the blinking cycle is stable, a state where the movement of the driver is active, and the like are recognized, the awakeness level estimation unit X2 estimates the awakeness level to be level 0.

In a case where a state in which the mouse of the driver is opened, a state in which movement of the line-of-sight is slow, a state in which blinking is slow and occurs frequently, a state in which a sitting adjustment is frequently performed, a state in which a hand is moved to the face, and the like are recognized, the awakeness level estimation unit X2 estimates the awakeness level to be level 1.

In a case where a state in which blinking considered to be conscious by the driver is present, a state in which there is unnecessary body movement such as head shaking and shoulder vertical movement, a state in which yawning or deep breathing frequently occurs, a state in which blinking and line-of-sight movement are slow, and the like are recognized, the awakeness level estimation unit X2 estimates the awakeness level to be level 2.

When a state in which the head of the driver inclines forward, a state in which the head falls backward, and a state in which the eyelids are closed for several seconds or more are recognized, the awakeness level estimation unit X2 estimates the awakeness level to be level 3. The awakeness level information estimated by the awakeness level estimation unit X2 in this way is provided to the permissible action determination unit X4. The awakeness level estimation unit X2 updates the awakeness level information in a timely manner based on the latest information.

The stress estimation unit X3 estimates the stress of the driver based on the state information about the driver acquired from the DSM 31. Specifically, the stress estimation unit X3 estimates the presence or absence of stress of the driver. For example, an analysis of an eye deflection state of the driver is used for the estimation of the presence or absence of stress of the driver. Further, the biometric sensor that detects the heart rate of the driver is provided in the driver seat, the steering wheel, and the like, and the estimation accuracy by the stress estimation unit X3 can be improved using the information about the heart rate detected by the biometric sensor. The stress information estimated by the stress estimation unit X3 is provided to the permissible action determination unit X4. The stress estimation unit X3 updates the stress information in a timely manner based on the latest information.

Based on the travel environment information acquired from the travel environment estimation unit X1, the awakeness level information acquired from the awakeness level estimation unit X2, and the stress information acquired from the stress estimation unit X3, the permissible action determination unit X4 determines a permissible action, which is permitted for the driver to take. The permissible action determination unit X4 determines a permissible action currently permitted to the driver. The determination result of the permissible action by the permissible action determination unit X4 can vary according to changes in the travel environment information, the awakeness level information, and the stress information, that is, changes in various situations. While the autonomous driving function is implemented, the permissible action determination unit X4 updates the determination result in a timely manner in response to the change in the travel environment information, the change in the awakeness level information, or the change in the stress information based on the provided latest information.

Specifically, the determination theory by the permissible action determination unit X4 is constructed based on a guide that the driver can keep a "minimum safe posture and a state in which a driving-mode can be switched in an emergency" when the passive driving function whose autonomous driving level is level 3 is implemented. That is, in a case where an unexpected driving-mode switch cause occurs in the autonomous driving at level 3, an action other than driving is permitted as a permissible action within a range in which the driver can safely take over driving.

The permissible action determination unit X4 sets a plurality of determination viewpoints in the determination of the permissible action. The permissible action determination unit X4 temporarily calculates an individual determination result for each determination viewpoint. Thereafter, the permissible action determination unit X4 definitely determines, as a permissible action, an action which is determined to be a permissible action in common between the respective determination viewpoints among the individual permissible actions for each determination viewpoint calculated provisionally.

In the first embodiment in which the range of permissible actions is defined stepwise as a driver requirement described below, the permissible action determination unit X4 extracts a determination result having the narrowest range of permissible actions (in other words, the lowest level of permission) among the provisional results for each determination viewpoint. The permissible action determination unit X4 sets a determination result having the narrowest permissible action range as a definite determination result (final result). The permissible action determination unit X4 provides information about a definite determination result to the information presentation content control unit X8.

The driver requirement is an index obtained by dividing actions other than driving stepwise based on the above-described determination theory. The driver requirement indicates that the higher the level, the wider the range of permissible actions (in other words, the higher the level of permission). The driver requirement takes a discrete numerical value that is an integer of 0 to 4. The driver requirement level 0 means that action other than driving is not permitted and is prohibited.

The action of driver requirement level 1 is an action in which the driver can easily return to a drivable state. For example, an operation on a mobile phone, a smartphone, or a CID with one hand, an action capable of holding a state in which the body does not fall to the left and right, and an action capable of holding the position of the eyes that can visually recognize all of the plurality of displays 21 are included in the actions of the driver requirement level 1. The driver requirement level 1 also includes an action of being able to immediately notice a driving-mode switch request using sound with a small volume to a medium volume of the speaker 22, an action of being able to hold a state in which the driver seat is not substantially reclined, and the like. That is, an action in which all the five senses can be used even when returning to the driving action is regarded as the driver requirement level 1 action.

The action of driver requirement level 2 is an action in which the driver can return to a drivable state with some movement. For example, an operation on the mobile phone, the smartphone, or the CID with both hands, an action of tilting the body to the left and right by about ±20 degrees, an action of being able to hold the position of the eyes that can visually recognize the plurality of displays 21 except for one, and the like are regarded as the driver requirement level 2 actions.

Furthermore, examples of the driver requirement level 2 include an action using sound with the volume of speaker 22 being medium to large, an action of performing in a state in which the driver seat is reclined to about 45 degrees, and the like.

The action of driver requirement level 3 is an action that allows the driver to return to driving in an emergency. Examples of the action include an action of putting an object on the knee, an action of tilting the body to the left and right by about ±130 degrees, and an action of being able to hold the position of the eyes that can visually recognize the plurality of displays 21 except for two.

The action of driver requirement level 4 is an action for which the execution of the autonomous driving at level 3 is necessarily prohibited. Examples of the action include a sleeping action, a drinking action, an action of leaving a seat, an action of releasing a seat belt, an action of performing with a state in which a driver seat is reclined to about 90 degrees, and an action of wearing an earphone. It is not normal for the permissible action determination unit X4 to determine the action of the driver requirement level 4 as a permissible action when the autonomous driving function at the autonomous driving level 3 is implemented.

Hereinafter, the determination of the permissible action by the permissible action determination unit X4 will be specifically described. The permissible action determination unit X4 sets four determination viewpoints. A first determination viewpoint is a road shape in the travel environment. The permissible action determination unit X4 determines a permissible action based on the road shape information acquired from the travel environment estimation unit X1. Specifically, the permissible action determination unit X4 identifies the road shape of the road on which the vehicle 1 travels from the road width, the road slope, the road curvature, the road section line shape, and the like.

When the road shape is a straight road, the permissible action determination unit X4 determines that the action up to the driver requirement level 3 is the permissible action. When the road shape is a curved road, the permissible action determination unit X4 determines that the action up to the driver requirement level 2 is the permissible action. Specifically, when the road on which the vehicle 1 travels has a curve shape and the length of the curve section exceeds a predetermined distance, the permissible action determination unit X4 narrows the range in which an action is determined to be a permissible action, and determines that the action up to the driver requirement level 2 is the permissible action. In addition, when the road shape is a shape requiring a lane change, the permissible action determination unit X4 determines that the action up to the driver requirement level 1 is the permissible action. That is, in the assumption that the driver takes over the driving, the higher the difficulty level of the driving action immediately after the takeover of the driving, the narrower the range of the permissible action.

The second determination viewpoint is a traveling scene in the travel environment. The permissible action determination unit X4 determines a permissible action based on the information about the traveling scene acquired from the travel environment estimation unit X1. Specifically, the permissible action determination unit X4 identifies the traveling scene of the vehicle 1 from the setting of the restricted area, the traffic volume, and the like.

When the traveling scene is traveling in a non traffic jam in the restricted area, the permissible action determination unit X4 determines that the action up to the driver requirement level 3 is the permissible action. When the traveling scene is traveling in a traffic jam in the restricted area, the permissible action determination unit X4 determines that the action up to the driver requirement level 3 is the permissible action. When the traveling scene is traveling in a traffic jam outside the restricted area, the permissible action determination unit X4 determines that the action up to the driver requirement level 2 is the permissible action. That is, the higher the possibility of sudden driving-mode switch to the driver, the narrower the range of permissible actions.

In addition, in a scene where the traveling scene is about to shift from the inside of the restricted area to the outside of the restricted area, the permissible action determination unit X4 determines the permissible action based on the distance or the arrival time from the vehicle 1 to the boundary of the restricted area. The permissible action determination unit X4 narrows the range of the permissible action as the distance to the boundary or the arrival time is shorter.

The third determination viewpoint is an awakeness level. The permissible action determination unit X4 determines a permissible action based on the awakeness level of the driver acquired from the awakeness level estimation unit X2. When the awakeness level of the driver is level 0, the permissible action determination unit X4 determines that the action up to the driver requirement level 3 is the permissible action. When the awakeness level of the driver is level 1, the permissible action determination unit X4 determines that the action up to the driver requirement level 2 is the permissible action. When the awakeness level of the driver is level 2, the permissible action determination unit X4 determines that the action of driver requirement level 1 is the permissible action. That is, the lower the handling ability of the driver handling the sudden driving-mode switch, the narrower the range of permissible actions.

In a case where the awakeness level of the driver is level 3, it is estimated that an emergency driving-mode switch cannot be performed. Therefore, the permissible action determination unit X4 outputs a command for executing an alarm to the alarm determination unit X6.

The fourth determination viewpoint is a stress. The permissible action determination unit X4 determines a permissible action based on the stress of the driver acquired from the stress estimation unit X3. When the driver has no stress, the permissible action determination unit X4 determines that the action up to the driver requirement level 3 is the permissible action. When the driver is stressed, the permissible action determination unit X4 determines that the action up to the driver requirement level 2 is the permissible action. That is, in the assumption that the driver takes over the driving, the higher the possibility of the operation mistake of the driving action immediately after the taking over is, the narrower the range of the permissible action is.

Among the above provisional determination results, a result for a determination viewpoint with a low level in the driver requirement is used as a definitive determination result. This is because the validity of the presentation of information about the permissible action described later is enhanced by permitting only the action that has passed the safety standard from each determination viewpoint.

Furthermore, the permissible action determination unit X4 roughly predicts the transition of the range of permissible actions in the travel route to the destination based on a determination viewpoint from which the future prediction is possible among a plurality of determination viewpoints. In the first embodiment, since the travel environment of the road on which the vehicle 1 is scheduled to travel can be estimated, the travel environment corresponds to a determination viewpoint from which the future prediction is possible.

The occupant monitoring unit X5 monitors the action of the driver based on the state information about the driver acquired from the DSM 31, the seating information about the driver from the seat sensor 32, and the like. The occupant monitoring unit X5 may identify the action of the driver by comprehensively determining the image analysis result of the captured image by the DSM 31 and the seating information. A learned artificial intelligence model constructed mainly by a neural network may be used to identify the action of the driver. The occupant monitoring unit X5 provides the monitoring result of the action of the driver to the alarm determination unit X6 and the information presentation content control unit X8.

The alarm determination unit X6 compares the monitoring result of the action of the driver acquired from the occupant monitoring unit X5 with the determination result of the permissible action acquired from the permissible action determination unit X4, and determines whether to issue an alarm for the driver. For example, in a case where the driver continuously performs an action (hereinafter, non-permissible action), other than the permissible action, determined not to be the permissible action by the permissible action determination unit X4 among actions other than driving for a predetermined alarm setting time or more, the alarm determination unit X6 determines to execute an alarm for the driver.

In addition, when a command to execute an alarm is input from the permissible action determination unit X4 as described above, the alarm determination unit X6 determines to execute an alarm for the driver. The alarm determination unit X6 provides alarm execution information to the information presentation content control unit X8.

The evacuation request unit X7 requests the autonomous driving ECU 40 to forcibly evacuate the vehicle 1 when the driver continues to perform the non-permissible action for a predetermined evacuation setting time or more after the alarm starts to be issued. The retraction mentioned here is, for example, the above-described MRM control.

The information presentation content control unit X8 controls the content that the information presentation device 20 is caused to present. The information presentation content control unit X8 acquires the determination result from the permissible action determination unit X4 to output a presentation request for causing the information presentation device 20 to present information about the determination result to the information presentation device 20. The information presentation content control unit X8 acquires the definitive determination result described above, and causes the information presentation device 20 to present information about the definitive determination result.

The information presentation content control unit X8 can cause the information presentation device 20 to present information indicating an action determined to be a permissible action among the information about the determination result. The information indicating the action determined to be the permissible action is, for example, information indicating that the driver seat may be reclined to 45 degrees in a case where the action up to the driver requirement level 2 is determined to be the permissible action.

Furthermore, for example, in a case where the action up to the driver requirement level 3 is determined to be the permissible action, the information presentation content control unit X8 causes the information presentation device 20 to present information indicating that it is allowed to watch a movie on the display 21 (for example, CID). Under such circumstances, in a case where a functional restriction on implementing a permissible action using the information presentation device 20 is imposed on the information presentation device 20, the information presentation content control unit X8 can make a request for a release of the restriction. The information presentation content control unit X8 requests the information presentation device 20 or the device that is the restriction entity imposing the restriction on the information presentation device 20 to release the restriction. For example, in a case where a functional restriction is imposed on a showing of the movie on the display 21, the information presentation content control unit X8 makes a request for a release of the functional restriction so that the display 21 can perform the showing of the movie.

In addition, the information presentation content control unit X8 can cause the information presentation device 20 to present information indicating an action determined to be a non-permissible action among the information about the determination result. The information indicating the action determined to be the non-permissible action is, for example, information indicating that the driver seat should not be reclined beyond 45 degrees in a case where the action up to the driver requirement level 2 is determined to be the permissible action.

The information presentation content control unit X8 can cause the information presentation device 20 to present information about the determination result of the permissible action at timing when the determination result of the permissible action is updated and the range of the permissible action (in other words, the driver requirement level) has changed. In the presentation at this timing, the information presentation content control unit X8 tones up the information presentation as the amount of change in the range of the permissible action increases. As the amount of change is larger, the tone in the information presentation is increased. For example, when the upper limit of the driver requirement level changes from 3 to 1, the amount of change is 2, and when the upper limit of the driver requirement level changes from 2 to 3, the amount of change is 1.

Here, examples of the tone up include improving saturation, improving luminance, increasing a display size, and thickening a line used for display in the case of display by an image. In addition, examples of the tone down include increasing the volume, using a high sound area, and enhancing the accent of the voice in the case of notification by sound.

When the information about the determination result is presented, the information presentation content control unit X8 selects a device to be used for information presentation from the information presentation device 20 based on the monitoring result of the action of the driver acquired from the occupant monitoring unit X5. That is, in consideration of the nature of actions other than driving by the driver, a device that is relatively easy to pay attention to among the information presentation devices 20 is used for information presentation.

For example, when the driver is watching a movie, information presentation is performed by display on the display 21. In more detail, when the driver is watching a movie with the CID, the information presentation is performed by display with the CID. Furthermore, for example, in a case where the driver is operating the smartphone, eating, or the like, information presentation is performed by notification by the speaker 22.

Furthermore, when the information related to the determination result is presented, the information presentation content control unit X8 can determine detailed content in the presentation based on the monitoring result of the action of the driver acquired from the occupant monitoring unit X5. For example, in a case where the driver is taking a non-permissible action, the information presentation content control unit X8 can cause the information presentation device 20 to present at least one of the reason why the non-permissible action should not be taken and a piece of advice for shifting the non-permissible action to the permissible action. Such information presentation is continuously presented, for example, until the driver stops the non-permissible action.

As an example, a case where an action of the driver requirement levels 1 to 2 is determined to be a permissible action, the reclining angle recognized as the permissible action is 45 degrees or less, and the driver reclines the seat at an angle of 70 degrees will be described. In this case, an example of the reason why the non-permissible action should not be taken includes a reason that "since the road shape is curved, it is necessary to return to a state where driving action can be taken with some movement considering the burden immediately after the driver has taken over driving". In this case, an example of a piece of advice for shifting the non-permissible action to the permissible action includes a reason that "please return the reclining angle to 45 degrees or less".

In a case where the driver continues the non-permissible action despite the information about the determination result of the permissible action being presented to the driver through the information presentation device 20, the occupant monitoring unit X5 monitors the continuation of the non-permissible action. When the non-permissible action continues for a predetermined alarm setting time or more, the alarm determination unit X6 determines to issue an alarm as described above. The information presentation content control unit X8 causes the information presentation device 20 to issue an alarm directed to the driver. The information presentation content control unit X8 preferably selects a plurality of devices to be used for the alarm among the information presentation devices 20. Furthermore, the information presentation content control unit X8 tones up the alarm to be more than that in the case of the above-described information presentation. In addition to such an alarm, the information presentation content control unit X8 may cause the information presentation device 20 to present a notice of lowering the autonomous driving level, in other words, a driving-mode switch to end the autonomous driving that has no surroundings monitoring obligation.

On the other hand, in a case where the driver is taking the permissible action, the information presentation content control unit X8 does not need to present information about the determination result more than necessary. However, the information presentation content control unit X8 presents information about the determination result from time to time (for example, periodically) after a restriction time period as a time period set to restrict the frequency of information presentation elapses.

In such a presentation, it is preferable that the information is presented in a tone down mode as compared with a case where the driver is taking a non-permissible action so as not to hinder the execution of the permissible action of the driver. Here, tone down is an antonym of tone up. Examples of the tone down include lowering saturation, lowering luminance, reducing a display size, and thinning a line used for display in the case of display by an image. In addition, examples of the tone down include reducing the volume, avoiding the use of a high sound area, and weakening the accent of the voice in the case of notification by sound.

Figure 3:
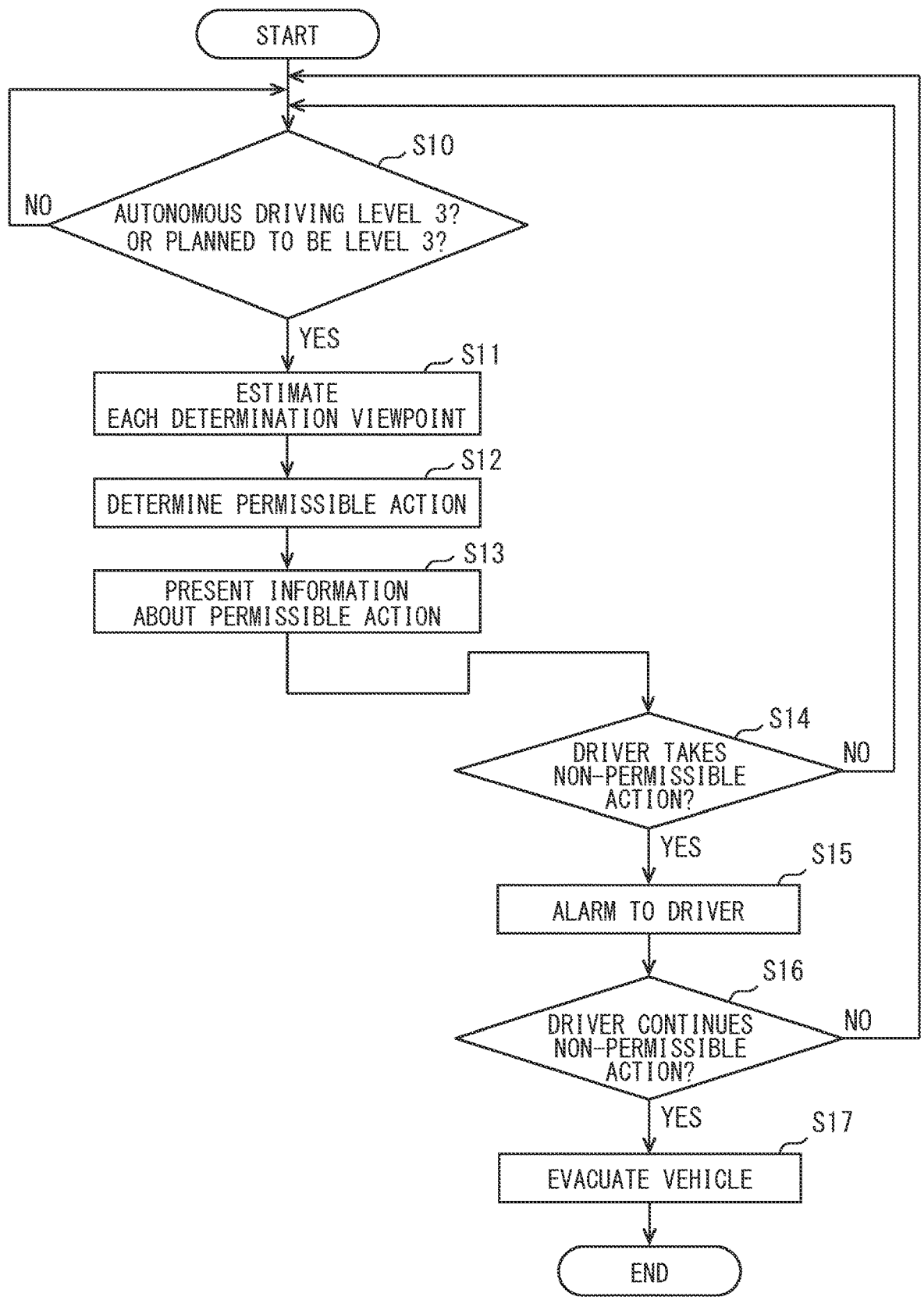
FIG. 3 is a flowchart illustrating processing by the HCU.

Next, a method of presenting information based on an information presentation program stored in the storage unit 13 and executed by the processing unit 11 will be described based on each step of the flowchart of FIG. 3.

First, in S10, for example, the permissible action determination unit X4 of the HCU 10 determines whether the autonomous driving level managed by the state management unit Y1 of the autonomous driving ECU 40 is in the state of level 3 or whether it is scheduled to become level 3. When an affirmative determination is made in S10, the process proceeds to S11. When a negative determination is made in S10, the process of S10 is performed again, for example, after a predetermined redetermination time elapses.

In S11, estimation regarding each determination viewpoint is performed. Specifically, the travel environment estimation unit X1 estimates the travel environment of the road on which the vehicle 1 travels. The awakeness level estimation unit X2 estimates the awakeness level of the driver. The stress estimation unit X3 estimates the stress of the driver. After the process of S11, the process proceeds to S12.

In S12, the permissible action determination unit X4 determines a permissible action, which is permitted for the driver to take. After the process of S12, the process proceeds to S13.

In S13, the information presentation content control unit X8 causes the information presentation device 20 to present information about the determination result of the permissible action. The driver can obtain information about the determination result of the permissible action. After the process of S13, the process proceeds to S14.

In S14, the occupant monitoring unit X5 and the alarm determination unit X6 determine whether the driver has continuously performed a non-permissible action for an alarm setting time or more. When an affirmative determination is made in S14, issuance of an alarm is determined, and the process proceeds to S15. When a negative determination is made in S14, the process returns to S11.

In S15, the information presentation content control unit X8 causes the information presentation device 20 to issue an alarm directed to the driver. The driver can recognize the alarm. After the process of S15, the process proceeds to S16.

In S16, the evacuation request unit X7 determines whether the driver has continuously performed the non-permissible action for the evacuation setting time or more after the alarm starts to be issued. When an affirmative determination is made in S16, the process proceeds to S17. When a negative determination is made in S16, the process returns to S11.

In S17, the evacuation request unit X7 requests the autonomous driving ECU 40 to forcibly evacuate the vehicle 1. Autonomous driving ECU 40 performs MRM control. The series of processing ends at S17.

Figure 4:
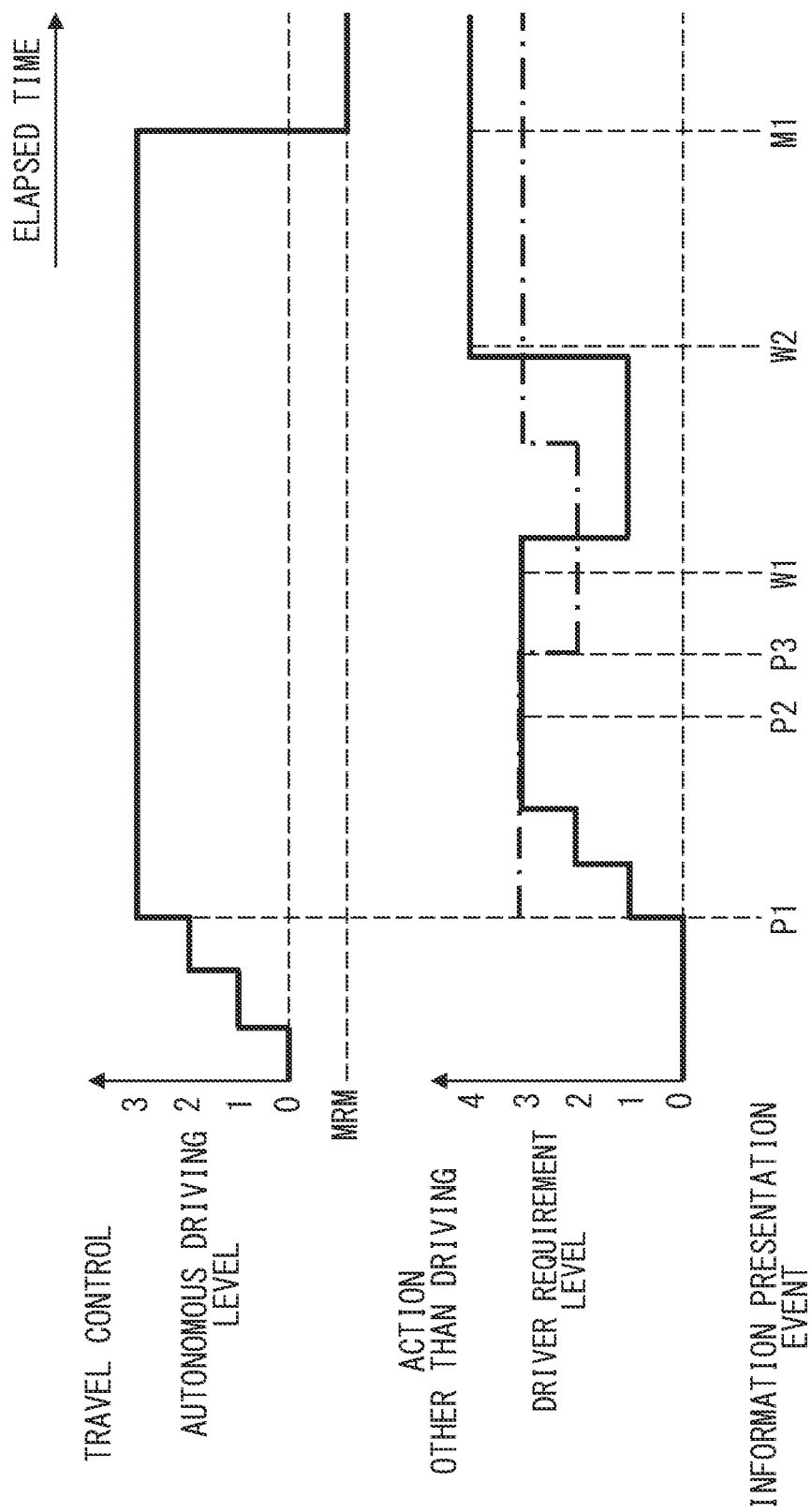
FIG. 4 is a time chart illustrating an example of the operations of an autonomous driving ECU and an HCU.
Figure 5:
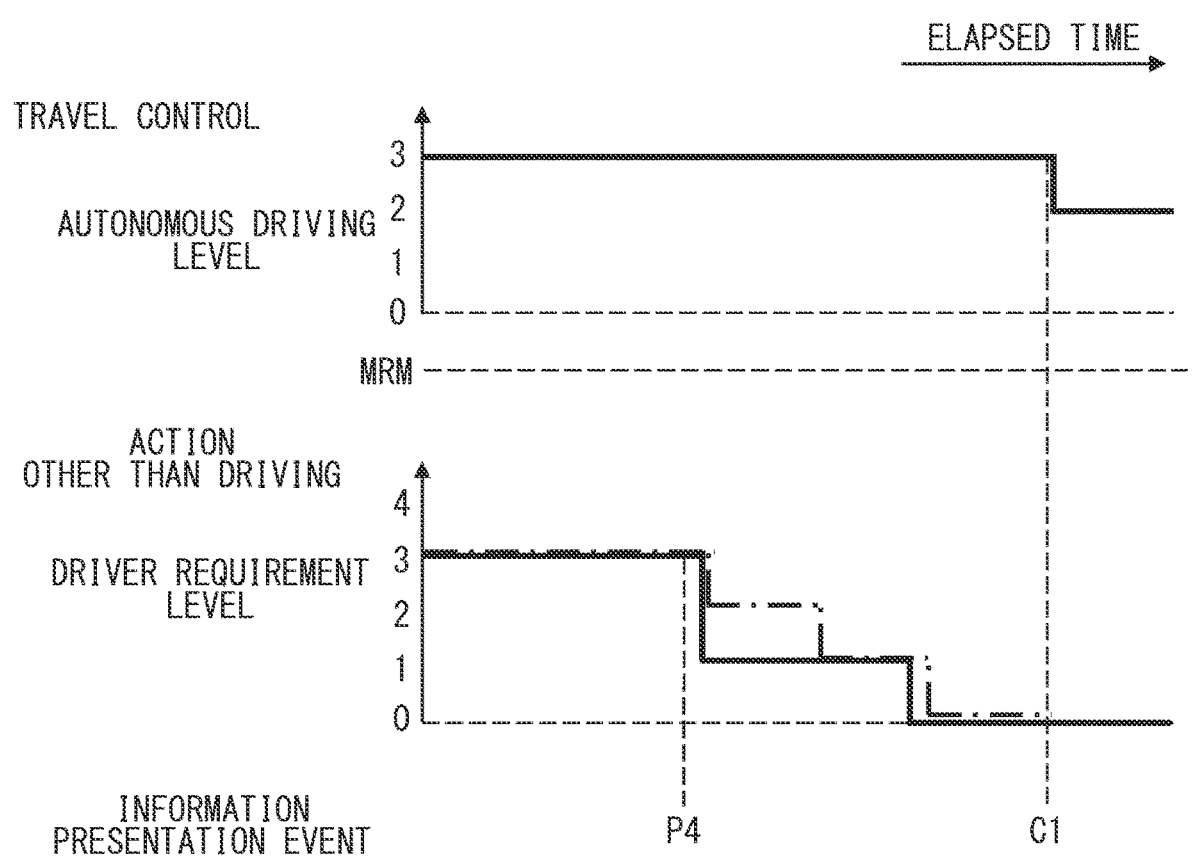
FIG. 5 is a time chart illustrating another example of the operations of the autonomous driving ECU and the HCU.

Next, an example of operations of the autonomous driving ECU 40 and the HCU 10 will be described with reference to time charts of FIGS. 4 and 5. In the chart illustrated in FIGS. 4 and 5 illustrating actions other than driving, a solid line indicates, when an action, other than driving, actually taken by a driver is applied to a driver requirement level, whether the action is applied to the driver requirement level. A dash-dot line indicates a result determined by the permissible action determination unit X4 as a driver requirement level.

The operation example of FIG. 4 illustrates a scene where the autonomous driving level shifts from the level 0 state to the level 3 and further shifts to the MRM control.

First, in the driving control, the autonomous driving level gradually increases from level 0 to levels 1 and 2. At this point, since an action other than driving is not substantially permitted, the action taken by the driver is regarded as an action corresponding to level 0 of the driver requirement level.

When the autonomous driving level is level 3, the range of permissible actions based on the determination result by the permissible action determination unit X4 is set to actions up to the driver requirement level 3. At this time, an event P1 is performed as an event (hereinafter, the information presentation event) in which the information presentation device 20 presents information based on the request by the HCU 10. The event P1 is an event for presenting, to the driver, information indicating that the autonomous driving level has shifted to level 3 and information indicating that the range of permissible action is actions up to the driver requirement level 3. In response to such information presentation, the driver gradually performs the action of driver requirement level 1, the action of level 2, and the action of level 3 as actions other than driving.

The permissible action determination unit X4 predicts that the range of permissible actions will be narrowed to the actions up to the driver requirement level 2 based on the determination viewpoint from which the future prediction is possible. Then, an event P2 is performed as the information presentation event. Event P2 is an event for presenting, to the driver, notice information indicating that the permissible action is scheduled to be narrowed down to the action from the driver requirement level 3 to level 2.

When the currently permissible range of permissible action narrows to the actions up to the driver requirement level 2, an event P3 is performed as the information presentation event. The event P3 is an event in which information indicating that the permissible action has narrowed down to the action from the driver requirement level 3 to the level 2 is presented to the driver.

Regardless of the events P2 and P3, when the driver continues the action of the driver requirement level 3 for the alarm setting time or more, an event W1 is performed as the information presentation event. The event W1 is an event of warning the driver to stop the action of the driver requirement level 3. In response to the event W1, when the driver stops the action of the driver requirement level 3 and shifts to, for example, the action of the driver requirement level 1, the count of the evacuation setting time is stopped.

Thereafter, it is assumed that the range of permissible actions has expanded to the actions up to driver requirement level 3. Under such circumstances, when it is determined that the driver is taking the action of the driver requirement level 4, that is, the action in which the execution of the autonomous driving at level 3 is prohibited, an event W2 is immediately performed. The event W2 is an event of warning the driver to stop the action of the driver requirement level 4. This warning can be said to be a warning that the driver's posture does not satisfy the minimum safe posture.

When the driver continues the action of the driver requirement level 4 for the evacuation setting time or more despite the event W2, the event M1 is performed as the information presentation event. Event M1 is an event in which information indicating that the driving control has shifted to the MRM control is presented to the driver. At the same time, the driving control by the autonomous driving ECU 40 shifts to the MRM control. This is the end of the description of the operation example of FIG. 4.

The operation example of FIG. 5 illustrates a scene of a so-called driving-mode switch from the vehicle 1 to the driver in which the autonomous driving level shifts from level 3 to level 2 as the vehicle 1 moves from the inside of the restricted area to the outside of the restricted area.

The vehicle 1 is traveling in the restricted area with the autonomous driving level being level 3. As the distance from the vehicle 1 to the boundary of the restricted area decreases, the range of permissible actions by the permissible action determination unit X4 narrows stepwise from the actions up to the driver requirement level 3.

When it is scheduled that the range of permissible actions is narrowed from the actions up to the driver requirement level 3, an event P4 is performed as the information presentation event. The event P4 is an event for presenting information recommended to stop an action other than driving to the driver in preparation for a driving-mode switch.

In response to the event P4, when the driver stops an action other than driving and the vehicle 1 approaches the boundary of the restricted area, an event C1 is performed. The event C1 is an event in which information requesting a driving-mode switch from the vehicle 1 to the driver is presented to the driver. When the driver takes over driving in response to the event C1, the autonomous driving level in the driving control is level 2 or less. This is the end of the description of the operation example of FIG. 5.

Functions and Effects

The functions and effects of the first embodiment described above will be described again below.

According to the first embodiment, information about the determination result of the permissible action determined by the permissible action determination unit X4 is presented by the information presentation device 20. At the time of operation of the autonomous driving function in which the necessity of grasping the situation such as the travel environment of the vehicle 1 is reduced for the driver, the driver can obtain information about the determination result of the permissible action via the information presentation device 20. Therefore, by referring to such information, the driver can easily take an appropriate action when the autonomous driving function is implemented.

Furthermore, according to the first embodiment, information indicating a permissible action among actions other than driving is presented by the information presentation device 20. By directly indicating the permissible action, it is possible to enhance the sense of security when the driver takes the action.

In addition, according to the first embodiment, information indicating a non-permissible action among actions other than driving is presented by the information presentation device 20. By directly indicating the non-permissible action, it is possible to enhance the ease of avoiding the execution of the non-permissible action when the driver takes an action other than driving.

According to the first embodiment, the permissible action is determined based on the travel environment. At the time of operation of the autonomous driving function in which the necessity of grasping the travel environment of the vehicle 1 is reduced for the driver, consideration of the travel environment in the determination of the permissible action is complementarily performed on behalf of the driver. Therefore, it is possible to enhance the appropriateness in performing an action, other than driving, by the driver.

In addition, according to the first embodiment, the permissible action is determined based on the shape of the road on which the vehicle 1 travels. That is, the determination result of the permissible action corresponds to the difficulty level of the driving action immediately after the takeover of the driving under the assumption that the driver takes over the driving. Therefore, it is possible to cause the driver to take an action other than driving while enhancing the safety of the driving action by the driver after the driving-mode switch.

Further, according to the first embodiment, in a case where the road on which the vehicle 1 travels has a curved shape and the length of the curve section exceeds a predetermined distance, the range in which an action is determined to be the permissible action is narrowly changed. That is, even when the road on which the vehicle travels has a curve shape, in a case where the curve section is short, the range of the permissible action is maintained at the driver requirement level 3. Therefore, for example, in a scene where the driver is relaxing with the backrest tilted, a situation in which a warning is received every time the vehicle travels in a short curve section is avoided. On the other hand, when the curve section continues for a predetermined distance or more, the driver requirement level is changed to be low, so that an appropriate alarm for the driver can be issued.

According to the first embodiment, the permissible action is determined based on the traveling scene of the vehicle 1. That is, the determination result of the permissible action corresponds to the possibility of sudden driving-mode switch to the driver. Therefore, it is possible to cause the driver to take an action other than driving while enhancing the safety at the time of the driving-mode switch.

According to the first embodiment, the permissible action is determined based on the awakeness level of the driver. That is, the determination result of the permissible action corresponds to the handling of the driver handling the sudden driving-mode switch. Therefore, it is possible to cause the driver to take an action other than driving while enhancing the safety at the time of the driving-mode switch.

In addition, according to the first embodiment, the permissible action is determined based on a stress of the driver. That is, the determination result of the permissible action corresponds to the possibility of the operation mistake of the driving action immediately after the takeover in the assumption that the driver takes over the driving. Therefore, it is possible to cause the driver to take an action other than driving while enhancing the safety of the driving action by the driver after the driving-mode switch.

In addition, according to the first embodiment, individual permissible actions are temporarily determined for a plurality of determination viewpoints. Thereafter, an action that is commonly determined to be a permissible action among the determination viewpoints is determined to be a definitive permissible action. Since the polygonal determination is performed from a plurality of determination viewpoints, and the minimum common action is definitely determined to be the permissible action, the validity in the determination of the permissible action can be remarkably enhanced.

In addition, according to the first embodiment, the permissible action determination unit X4 determines a permissible action based on a driver requirement as a determination index in which an action other than driving is associated with a level of permission of the permissible action according to the posture of the driver in the action other than driving. It is possible to embody a determination theory based on a guide that the driver can keep a "minimum safe posture and a state in which a driving-mode can be switched in an emergency" by relatively simple processing operation. Therefore, it is possible to easily realize determination of a highly valid permissible action.

In addition, according to the first embodiment, the permissible action determination unit X4 determines a permissible action based on a driver requirement as a determination index in which an action other than driving is associated with a level of permission of the permissible action according to the driver seat position in the action other than driving. The position of the driver seat in this case is, for example, a reclining angle. It is possible to embody a determination theory based on a guide that the driver can keep a "minimum safe posture and a state in which a driving-mode can be switched in an emergency" by relatively simple processing operation. Therefore, it is possible to easily realize determination of a highly valid permissible action.

In addition, according to the first embodiment, in a case where a functional restriction for implementing a permissible action using the information presentation device 20 is imposed on the information presentation device 20, release of the restriction is requested. Thus, the driver can smoothly perform a permissible action using the information presentation device 20.

Furthermore, according to the first embodiment, the device to be used for the information presentation by the information presentation device 20 is selected from the device that presents the visual information and the device that presents the auditory information according to an action, other than driving, that is estimated to be currently taken by the driver. Such selection makes it easier for the driver to recognize the information to be presented. By presenting information that is easily recognized, it is easy to guide the driver to an appropriate action.

Furthermore, according to the first embodiment, in a case where it is estimated that the driver is taking a non-permissible action, the reason why the non-permissible action should not be taken is presented by the information presentation device 20. By making the driver understand the reason, it is easy to guide the driver to an appropriate action.

Furthermore, according to the first embodiment, in a case where it is estimated that the driver is taking a non-permissible action, a piece of advice for shifting the non-permissible action currently taken by the driver to a permissible action is presented by the information presentation device. Such a piece of advice makes it possible to smoothly shift the action of the driver to a permissible action.

Furthermore, according to the first embodiment, in a case where it is estimated that the driver is continuously performing a non-permissible action, an alarm directed to the driver is performed by the information presentation device 20. By causing the driver to recognize the alarm, it is possible to urge the driver to stop the non-permissible action.

In addition, according to the first embodiment, the information presentation device 20 presents notice of a driving-mode switch to end the autonomous driving function together with issuance of the alarm. By causing the driver to recognize that the autonomous driving function is terminated when this state is maintained, it is possible to enhance the effect of promoting the cancellation of the non-permissible action.

Further, according to the first embodiment, when it is estimated that the driver further continuously performs a non-permissible action after the alarm starts to be issued, the vehicle 1 is required to be forcibly evacuated. By evacuating the vehicle 1, it is possible to forcibly avoid the continuation state of the inappropriate non-permissible action during the operation of the autonomous driving function.

Furthermore, according to the first embodiment, in a case where it is estimated that the driver is taking a permissible action, information about a determination result of the permissible action is sometimes presented by the information presentation device 20 after a restriction time period elapses. With the restriction time period, an increase in the frequency of information presentation is restricted, so that it is possible to reduce annoyance of information presentation felt by the driver.

Furthermore, according to the first embodiment, in a case where the determined range of the permissible action changes, the information presentation device 20 tones up the information presentation as the amount of change in the range of the permissible action increases. Since the strength of information presentation is appropriately set according to the degree of influence of the driver on actions other than driving, it is possible to reduce annoyance of information presentation felt by the driver.

Second Embodiment

Figure 6:
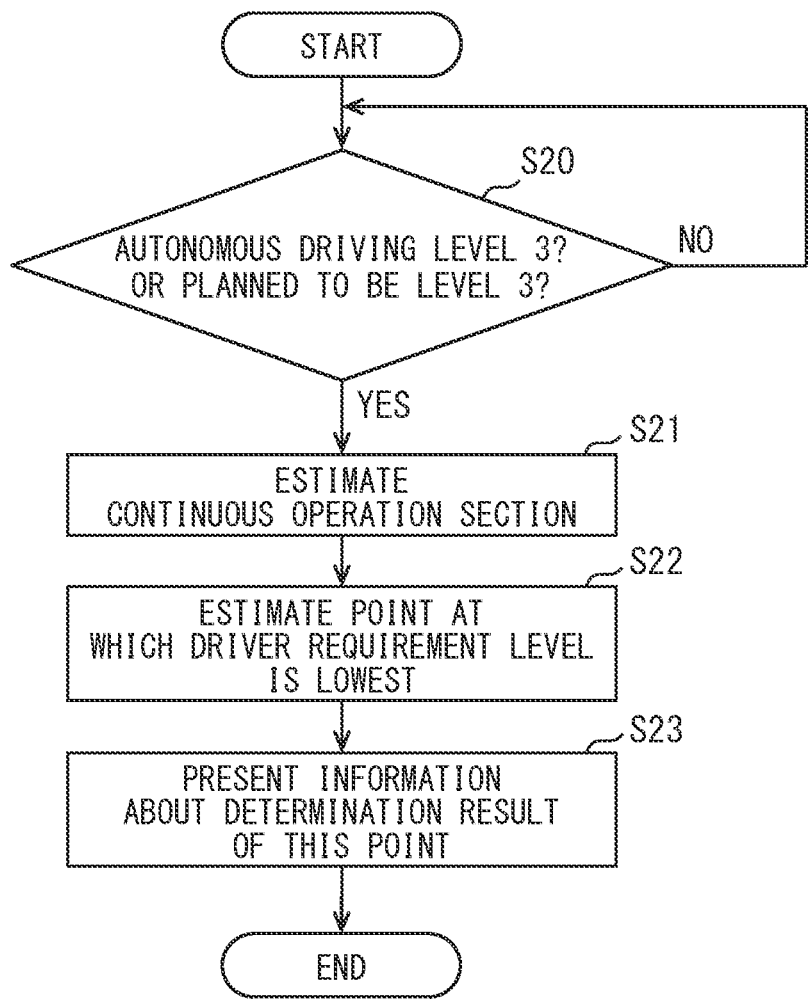
FIG. 6 is a flowchart illustrating processing by the HCU according to a second embodiment.

As illustrated in FIG. 6, the second embodiment is a modification of the first embodiment. The second embodiment will be described focusing on differences from the first embodiment.

In the second embodiment, the permissible action determination unit X4 estimates a continuous operation section in which the autonomous driving function is scheduled to be continuously implemented in response to the autonomous driving level by the state management unit Y1 becoming level 3. The continuous operation section means a group of sections in which the vehicle 1 can travel while the autonomous driving level is maintained at level 3 by the planned traveling line generated by the autonomous driving ECU 40.

Furthermore, the permissible action determination unit X4 estimates a point at which the level of permission of the determination result of the permissible action is the lowest within the continuous operation section based on the determination viewpoint from which the future prediction is possible. In the second embodiment, as in the first embodiment, the determination result of the permissible action is defined by the driver requirement. Therefore, the driver requirement level corresponds to the level of permission of the determination result. That is, the point at which the level of permission of the determination result of the permissible action is the lowest is a point at which the upper limit of the driver requirement level recognized as the permissible action is the lowest. The permissible action determination unit X4 provides the information presentation content control unit X8 with the information about the continuous operation section, the information about the point at which the level of permission is the lowest, and the information about the determination result of the permissible action at the point.

The information presentation content control unit X8 causes the information presentation device 20 to consistently present information related to the determination result of the permissible action for the point at which the level of permission is the lowest while the autonomous driving function is implemented in association with the continuous operation section.

For example, in a case where action up to the driver requirement level 2 is permitted at the point, it is assumed that action up to the driver requirement level 3 is temporarily permitted in the continuous operation section. Even in this temporary state, the information presentation content control unit X8 causes the information presentation device 20 to present information indicating that action up to the driver requirement level 2 is permitted.

Next, a method of presenting information based on an information presentation program stored in the storage unit 13 and executed by the processing unit 11 will be described based on each step of the flowchart of FIG. 6.

S20 is the same as S10 of the first embodiment. When an affirmative determination is made in S20, the process proceeds to S21. When a negative determination is made in S20, the process of S20 is performed again, for example, after a predetermined redetermination time elapses.

In S21, the permissible action determination unit X4 estimates a continuous operation section. After the process of S21, the process proceeds to S22.

In S22, the permissible action determination unit X4 estimates a point at which the upper limit of the driver requirement level recognized as the permissible action is the lowest within the continuous operation section. After the process of S22, the process proceeds to S23.

In S23, the information presentation content control unit X8 causes the information presentation device 20 to present information about the determination result of the permissible action at the point estimated in S22. The driver can obtain information about the determination result of the permissible action. The series of processing ends at S23. Alternatively, after the process of S23, the process corresponding to S14 to S17 of the first embodiment may be performed.

According to the second embodiment described above, it is possible to suppress the occurrence of a situation in which, in the continuous operation section, the range of the presented permissible action is frequently changed, and an action, other than driving, taken by the driver is required to be changed each time. The driver can continuously perform the action, other than driving, that is optimized for the continuous operation section and is consistent.

Third Embodiment

Figure 7:
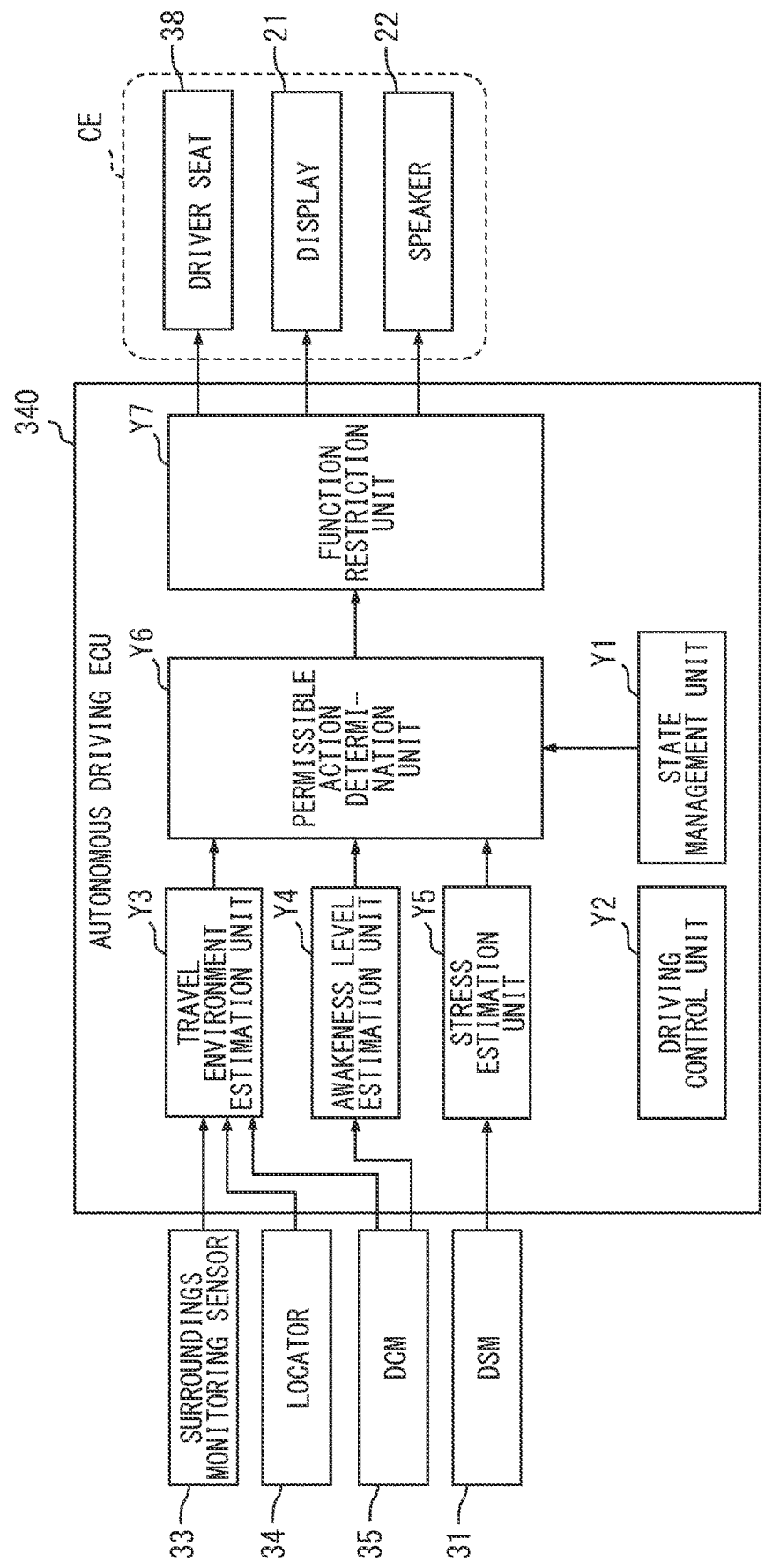
FIG. 7 is a diagram illustrating a schematic configuration of the autonomous driving ECU according to a third embodiment.
Figure 8:
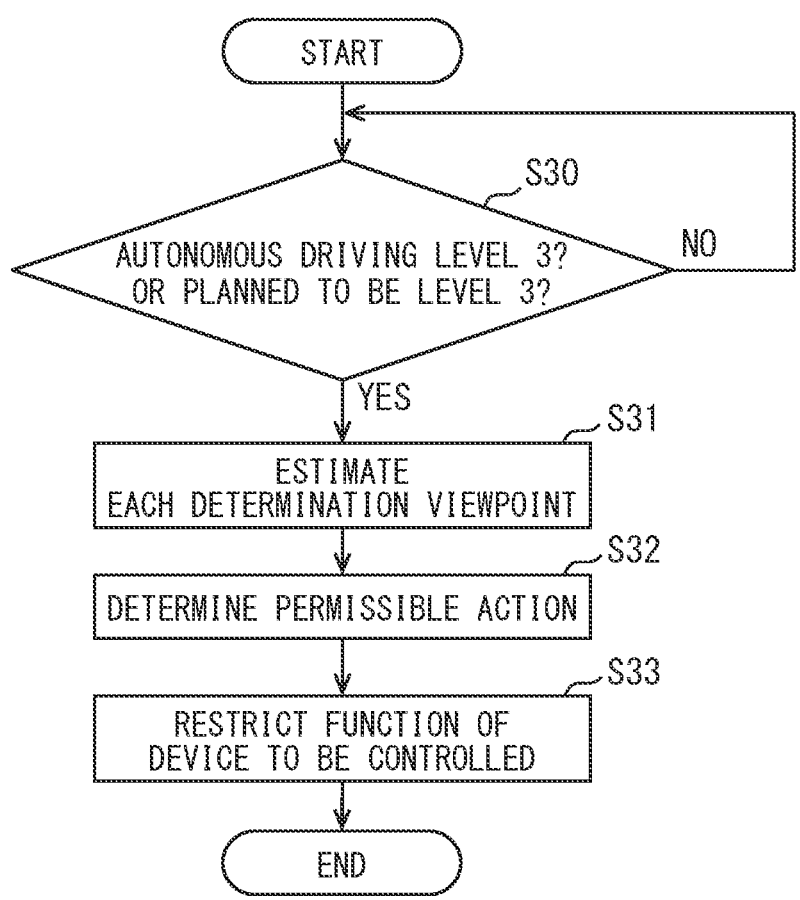
FIG. 8 is a flowchart illustrating processing by the autonomous driving ECU according to the third embodiment.

As illustrated in FIGS. 7 and 8, the third embodiment is a modification of the first embodiment. The third embodiment will be described focusing on differences from the first embodiment.

In the third embodiment of the present disclosure, as illustrated in FIG. 7, a function control device controls a function of a device to be controlled CE. In the third embodiment, the function control device is an autonomous driving ECU 340 used in the vehicle 1. The autonomous driving ECU 340 of the third embodiment can control not only the realization of the autonomous driving but also the function of the device to be controlled CE for assisting the appropriate execution of an action, other than driving, by the driver in the state where the autonomous driving level is level 3.

Here, the device to be controlled CE includes one or more in-vehicle devices configured to be able to assist an action, other than driving, by the driver. As an example, a plurality of in-vehicle devices such as a driver seat 38, the display 21, and a speaker 22 is included in the device to be controlled CE.

The autonomous driving ECU 340 includes function units such as a travel environment estimation unit Y3, an awakeness level estimation unit Y4, a stress estimation unit Y5, a permissible action determination unit Y6, and a function restriction unit Y7 in addition to function units such as the state management unit Y1 and the driving control unit Y2 provided in the autonomous driving ECU 40 according to the first embodiment.

The travel environment estimation unit Y3, the awakeness level estimation unit Y4, the stress estimation unit Y5, and the permissible action determination unit Y6 are similar to the travel environment estimation unit X1, the awakeness level estimation unit X2, the stress estimation unit X3, and the permissible action determination unit X4 provided in the HCU 10 of the first embodiment. However, the determination result of the permissible action by the permissible action determination unit Y6 is provided to the function restriction unit Y7.

The function restriction unit Y7 restricts the function of the device to be controlled CE that causes the driver to realize the non-permissible action based on the determination result of the permissible action. The function restriction unit Y7 restricts the angle at which the driver seat 38 can be reclined based on the determination result of the permissible action. For example, when the permissible action determination unit Y6 permits actions up to the driver requirement level 2, the function restriction unit Y7 restricts the reclining angle of the driver seat 38 exceeding 45 degrees through the reclining drive device provided in the driver seat 38. Due to the angle restriction of the reclining, the driver can easily maintain the safe posture required to prepare for the cause of sudden driving-mode change.

The function restriction unit Y7 restricts the display content of the display 21 based on the determination result of the permissible action. For example, in a case where the action up to the driver requirement level 1 is permitted by the permissible action determination unit Y6, the function restriction unit Y7 restricts a function of a game that requires a touch operation with both hands on the display 21 (for example, CID). Due to the restriction of the display content of the display 21, the driver can easily maintain the state in which the emergency driving switch can be performed according to the situation.

The function restriction unit Y7 restricts the volume of the speaker 22 based on the determination result of the permissible action. For example, when the permissible action determination unit Y6 permits the actions up to the driver requirement level 1, the function restriction unit Y7 sets the upper limit of the volume that can be output by the speaker 22 in association with the execution of the action other than driving so that the volume of the speaker 22 does not become large. By setting the upper limit of the sound volume, the driver can easily maintain the state in which the emergency driving-mode switch is possible according to the situation.

Next, a method of restricting the function of the device to be controlled CE based on the function control program stored in the storage unit 43 and executed by the processing unit 41 will be described based on each step of the flowchart of FIG. 8.

The processes performed in S30 to S32 are substantially the same as the processes performed in S10 to S12 of the first embodiment. After the process of S32, the step performed proceeds to S33.

In S33, the function restriction unit Y7 restricts the functions of the driver seat 38, the display 21, and the speaker 22 as necessary based on the determination result of the permissible action in S32. The series of processing ends at S33.

In the third embodiment, the HCU 10 may or may not have a function of causing an information presentation device to present information about a determination result of a permissible action.

According to the third embodiment described above, the function of the device to be controlled CE capable of implementing an action, other than the permissible actions, among actions other than driving is restricted based on the permissible action determined by the permissible action determination unit Y6. A situation in which the driver inadvertently takes an action other than the permissible action at the time of operation of the autonomous driving function in which the necessity of grasping the situation such as the travel environment of the vehicle 1 is reduced for the driver is suppressed by the functional restriction. Therefore, the driver can easily take an appropriate action when the autonomous driving function is implemented.

Fourth Embodiment

Figure 9:
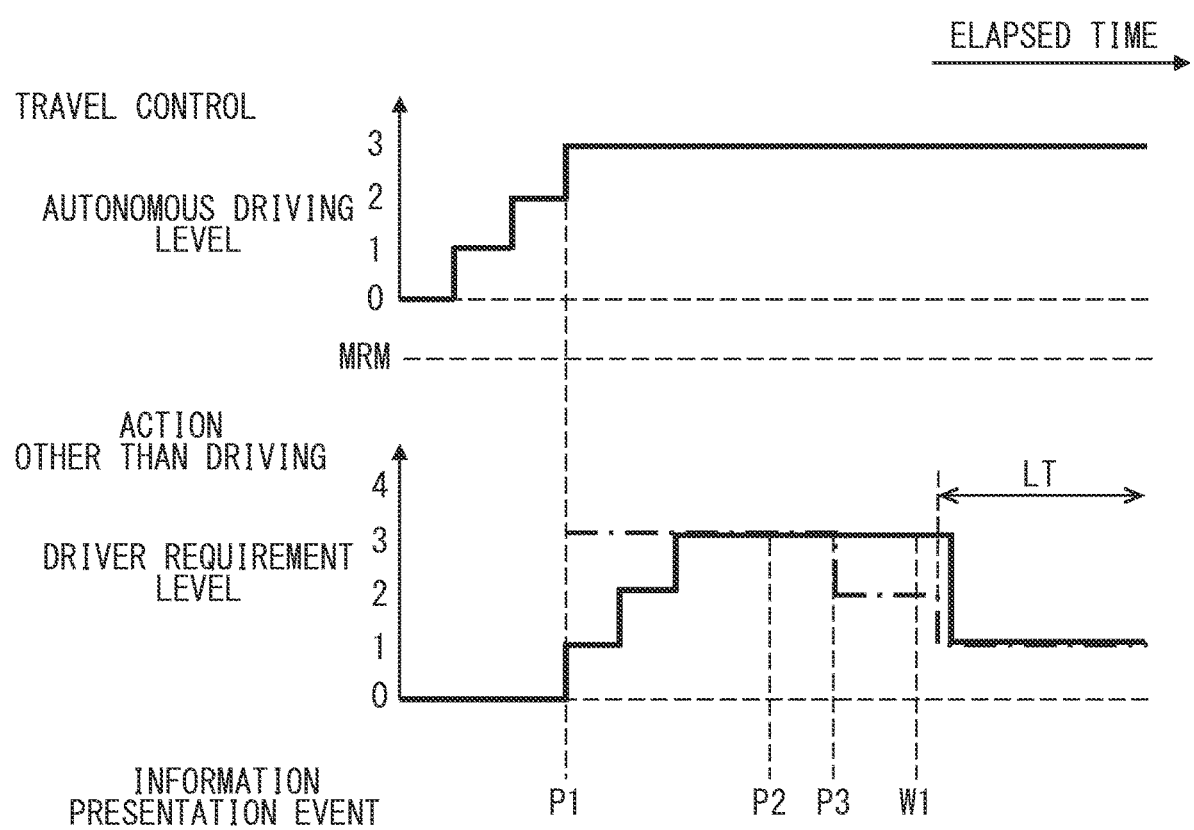
FIG. 9 is a time chart illustrating an example of the operations of the autonomous driving ECU and the HCU according to a fourth embodiment.
Figure 10:
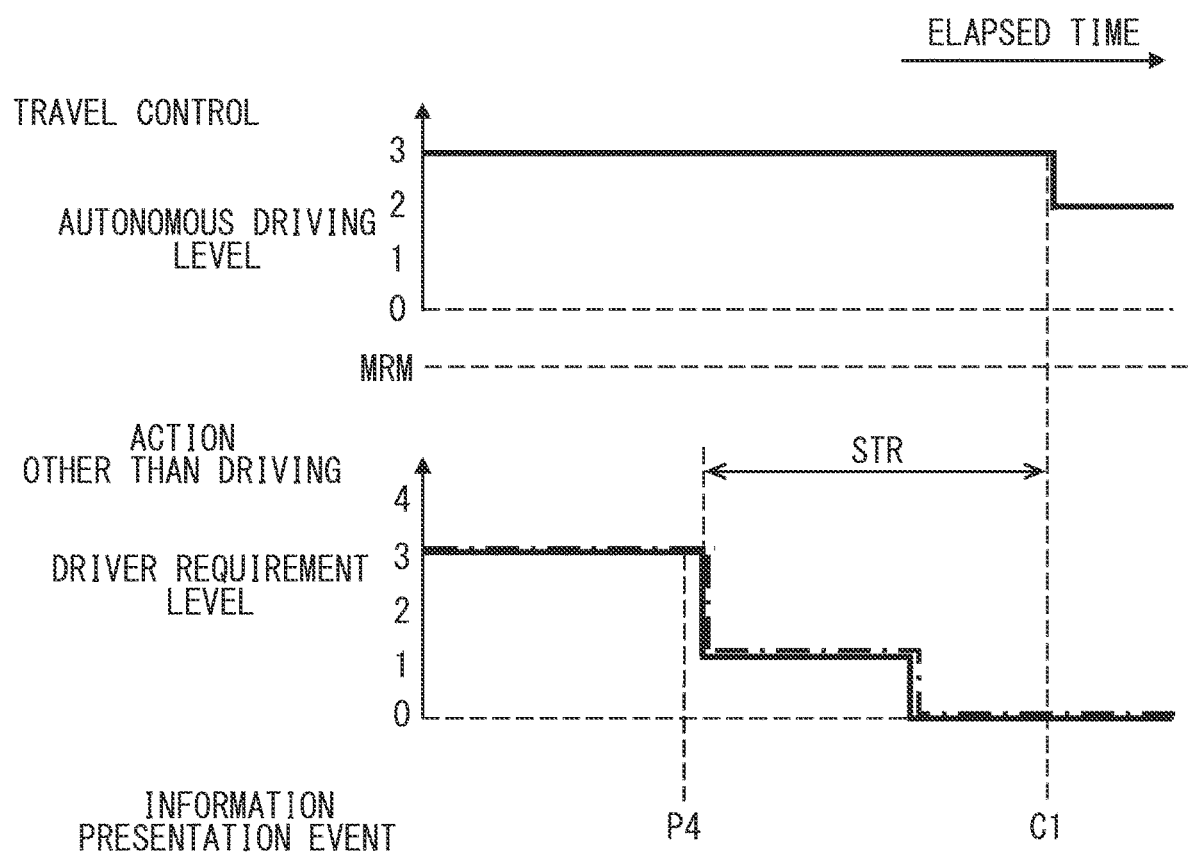
FIG. 10 is a time chart illustrating another example of the operations of the autonomous driving ECU and the HCU according to the fourth embodiment.

An operation example of the autonomous driving ECU 40 and the HCU 10 according to the fourth embodiment illustrated in FIGS. 9 and 10 is a modification of the first embodiment illustrated in FIGS. 4 and 5. Also in FIGS. 9 and 10, a solid line indicates the driver requirement level corresponding to the action taken by the driver, and a dash-dot line indicates the driver requirement level that is the determination result of the permissible action determination unit X4.

In the operation example illustrated in FIG. 9, the information presentation content control unit X8 sequentially performs an event P1 for making notification of the shift to the level 3 autonomous driving and events P2 and P3 for giving notice and notification of the change to the driver requirement level 2. Further, when the driver continuously performs the action exceeding the driver requirement level determined by the permissible action determination unit X4, the information presentation content control unit X8 performs an event W1 requesting cancellation of the action being performed.

When the warning about the action that is not permitted is issued by the information presentation content control unit X8, the permissible action determination unit X4 fixes the driver requirement level to a predetermined level for a predetermined period defined in advance. Specifically, the permissible action determination unit X4 sets a period until the main power supply or the ignition of the vehicle 1 is turned off (hereinafter, the restriction period LT), and sets the driver requirement level to be lower than that in the normal case where the warning is not issued (see FIG. 4) in the restriction period LT. The permissible action determination unit X4 fixes the driver requirement level to the lowest level 1 until the end of the restriction period LT. In the restriction period LT, the information presentation content control unit X8 presents, to the driver, information indicating that the driver requirement level is intentionally fixed low by the permissible action determination unit X4.

In the scene of the operation example illustrated in FIG. 10, the state management unit Y1 determines that autonomous driving level is lowered the from level 3 to level 2 or lower due to the scheduled end of the permitted area (restricted area) or deviation from the use condition. In addition, the state management unit Y1 also determines the termination of the level 3 autonomous driving when it is estimated that the driver is continuously performing an action other than the permissible action. The state management unit Y1 sets a switch preparation section STR before the driving-mode switch is performed with reference to a time (see event C1) or a point where the driving-mode switch is performed from the autonomous driving ECU 40 to the driver. The state management unit Y1 sets, as the switch preparation section STR, a section from the time or point at which the event P4 making notification of narrowing of the driver requirement level is completed to the time or point at which the driving-mode switch is started.

The permissible action determination unit X4 fixes the driver requirement to a predetermined level or less in the switch preparation section STR before the driving-mode switch. As an example, after the information presentation of the event P4 by the information presentation content control unit X8, the permissible action determination unit X4 narrows the range in which an action is determined to be the permissible action from the driver requirement level 3 or the like to the driver requirement level 1 or 0 set in advance as the switch preparation range. The permissible action determination unit X4 continues a state in which the driver requirement level is fixed to be equal to or lower than the lowest level 1, and then transitions a level to a driver requirement level 0 in which the action other than driving is prohibited.

In a case where the information presentation content control unit X8 recognizes the end schedule of the autonomous driving at level 3 due to the end of the permitted area, the deviation from the use condition, the continuation of the inappropriate action, and the like, the information presentation content control unit X8 at least gives notice of the driving-mode switch to end the autonomous driving function in the information presentation at the event P4. The information presentation content control unit X8 presents, to the driver, information indicating the driver requirement level restricted to the switch preparation range in the switch preparation section STR before the noticed end of the autonomous driving.

Further, the information presentation content control unit X8 presents, to the driver, information requesting a driving-mode switch in the event C1.

Also in the fourth embodiment described so far, the same effects as those of the first embodiment are obtained, and the driver can obtain information about the determination result of the permissible action, so that the driver can easily take an appropriate action.

In addition, according to the fourth embodiment, when a warning for an unauthorized action is presented, the driver requirement level is fixed to level 1 in a subsequent restriction period LT. According to such restraint control, it is possible to make the driver aware of not performing an unacceptable second task. As a result, overconfidence of the autonomous driving function by the driver can be avoided, so that the driver can easily take an appropriate action during the autonomous driving period.

Further, according to the fourth embodiment, in a case where the information presentation content control unit X8 grasps the end schedule of a permitted area, the information presentation content control unit X8 causes the information presentation device 20 to present a notice of a driving-mode switch to end the autonomous driving function. Therefore, in accordance with the narrowing of the range of the permissible action by the permissible action determination unit X4, it is possible to cause the driver to end the action other than driving and smoothly start the driving operation.

Further, according to the fourth embodiment, in the switch preparation section STR before the driving-mode switch from the autonomous driving function to the driver is performed, the permissible action determination unit X4 narrows the range in which an action is determined to be the permissible action to a predetermined switch preparation range. Therefore, it is possible to prompt the driver to start a smooth driving operation by ending an action, in execution, other than driving at an early stage.

Fifth Embodiment

Figure 11:
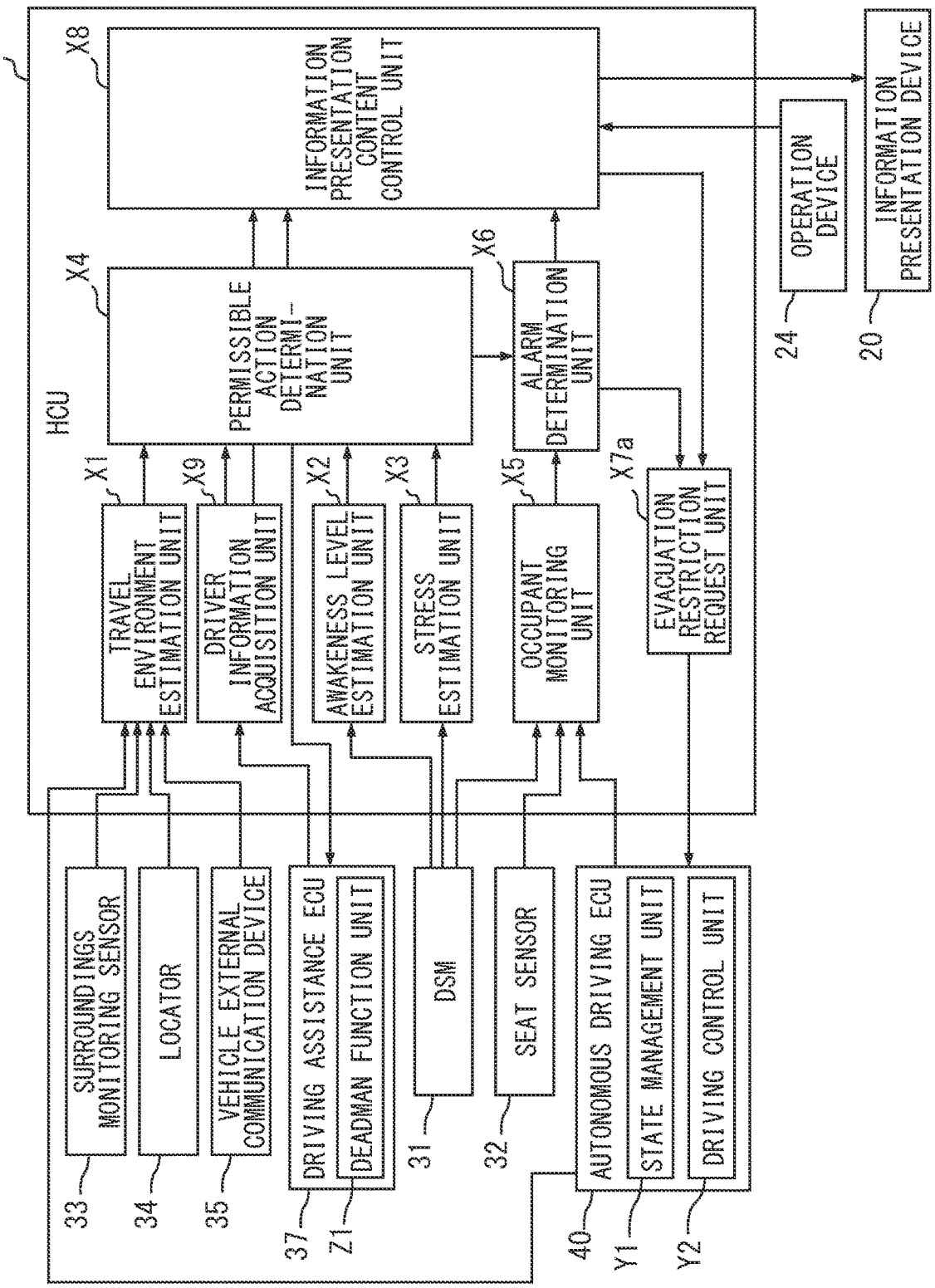
FIG. 11 is a diagram illustrating an overall image of an in-vehicle network according to a fifth embodiment.

The fifth embodiment illustrated in FIGS. 11 to 14 is still another modification of the first embodiment. The driving assistance ECU 37 of the fifth embodiment illustrated in FIG. 11 is provided with a deadman function unit Z1. The deadman function unit Z1 is a function unit similar to the awakeness level estimation unit X2, the stress estimation unit X3, the occupant monitoring unit X5, and the like. The deadman function unit Z1 functions as an abnormality detection device that automatically detects that it is difficult for the driver to perform driving due to a reason that it is difficult to predict in advance, such as a sudden illness, based on the state information about the driver acquired from the DSM 31. In order to diagnose that the driver is in a difficult-to-drive state, the deadman function unit Z1 detects the inclination of the upper body of the driver, the inclination of the head with respect to the upper body, and the like, and grasps collapse of a posture of the driver. When collapse of a posture of the driver continues, the deadman function unit Z1 determines that it is difficult to perform driving, and outputs a detection result indicating an abnormal state to the communication bus 99. The abnormal state of the driver in the following description indicates a state in which the posture of the driver collapses into an inappropriate posture.

The HCU 10 further includes a driver information acquisition unit X9 in addition to the function units that confirm the driver requirements in the autonomous driving at level 3. The driver information acquisition unit X9 acquires the detection result of the abnormal state by the deadman function unit Z1, and grasps the state of the driver along with the awakeness level estimation unit X2, the stress estimation unit X3, the occupant monitoring unit X5, and the like. When the driver information acquisition unit X9 grasps the driver's difficult-to-drive state, the driver information acquisition unit X9 requests the information presentation content control unit X8 to make notification that an abnormal state has been detected. The information presentation content control unit X8 notifies the driver and the fellow passenger in the vehicle interior that the abnormality is being detected by voice, display, or the like.

Here, in the autonomous driving period at level 3 in which there is no surroundings monitoring obligation, as described above, the driver in the vehicle interior is permitted to take an action, other than driving, except for a peculiar action such as sleeping, drinking, and seat belt disengagement. Therefore, during the autonomous driving period, for example, the driver may recline the backrest of the driver seat and spend time in a relaxed posture. Such a posture has no problem as a driver requirement during autonomous driving, but is in a bad state as a driving posture. Thus, there is a possibility that the deadman function unit Z1 erroneously recognizes the relaxed posture state of the driver during the autonomous driving as a state in which the driver is in collapse of a posture and it is difficult to perform driving, and outputs a detection result indicating an abnormal state.

In order to cope with such a problem, when the driver information acquisition unit X9 acquires a detection result indicating an abnormal state (collapse of a posture) during the autonomous driving period at level 3, the HCU 10 performs a notification process different from that at the time of the manual driving or the time of the autonomous driving at level 2 or lower. Hereinafter, an operation example of the HCU 10 and the autonomous driving ECU 40 when a detection result indicating an abnormal state is acquired during the autonomous driving at level 3 will be described with reference to FIG. 12 and FIG. 11.

In a case where the shift to the level 3 autonomous driving is performed in a state where the abnormality detection of the driver by the cooperation of the DSM 31 and the deadman function unit Z1 is enabled, the information presentation content control unit X8 performs an event N1 as the information presentation event by the information presentation device 20. The event N1 is started before or substantially at the same time as the event P1 for making notification of the shift to the level 3 autonomous driving. The information presentation of the event N1 may be performed in parallel with the information presentation of the event P1. In the event N1, information is presented requesting the driver to take a posture in which the driving posture can be detected by the DSM 31.

When the driver's driving posture is bad during the autonomous driving period at level 3, a detection result indicating an abnormal state (collapse of a posture) of the driver is output from the deadman function unit Z1 to the driver information acquisition unit X9. The information presentation content control unit X8 causes information presentation device 20 to perform an information presentation event N2 based on acquisition of the detection result by the driver information acquisition unit X9. In the event N2, even when a collapsed posture of the driver is within a range permitted as a permissible action during level 3 autonomous driving, posture abnormality information about collapse of a posture of the driver is presented to occupants including a fellow passenger. In the event N2, at least a notification for causing the presence or absence of abnormality of the driver to be replied and a notification indicating a reason for determining that there is a possibility of abnormality in the driver are made.

An evacuation restriction request unit X7a further has a function of requesting the autonomous driving ECU 40 to impose a functional restriction on the travel control, in addition to the substantially same function as the evacuation request unit X7 of the first embodiment. The evacuation restriction request unit X7a requests the autonomous driving ECU 40 to impose functional restriction on travel control substantially at the same time as the event N2 based on the detection result indicating the abnormal state. Specifically, the evacuation restriction request unit X7a outputs a speed suppression request to the autonomous driving ECU 40. Based on the speed suppression request, the autonomous driving ECU 40 switches to a (low) set speed lower than the normal set speed of the autonomous driving at level 3, and attempts deceleration control. Even when the deceleration control is performed due to the bad driving posture of the driver, the autonomous driving at level 3 is continued.

The information presentation content control unit X8 determines the presence or absence of the input of the user operation to the operation device 24 after presenting the request for replying the presence or absence of the abnormality by the event N2. An operation device 24 is an input unit that receives a user operation by a driver, a fellow passenger, or the like, and is, for example, a steer switch, an operation lever, a voice input device, or the like. An occupant such as a driver and a fellow passenger can input, to the operation device 24, a user operation of replying that there is no abnormality in the driver or a user operation of replying that there is an abnormality in the driver.

In a case where the information presentation content control unit X8 acquires the input information of the user operation of replying that there is no abnormality in the driver, the information presentation content control unit X8 performs an information presentation event N3 by the information presentation device 20. In the event N3, the information presentation content control unit X8 makes a notification indicating continuation of the autonomous driving at level 3 and a notification prompting improvement in the driving posture. In the information presentation in the event N3, the driver is urged to improve the driving posture to such an extent that erroneous recognition by the deadman function unit Z1 can be avoided.

After the presentation of the request for improvement in the driving posture by the event N3, the information presentation content control unit X8 refers to the content of the detection result acquired by the driver information acquisition unit X9 and determines whether the driving posture of the driver has been improved. When the information presentation content control unit X8 determines that the driving posture of the driver is improved, a request to cancel the speed suppression is output from the evacuation restriction request unit X7a to the autonomous driving ECU 40. As a result, the autonomous driving ECU 40 ends the deceleration control and starts traveling at a normal set speed.

On the other hand, when the driver's driving posture is not improved, the information presentation content control unit X8 repeatedly presents the request for improvement in the driving posture. In this case, the speed suppression control by the autonomous driving ECU 40 is also continued. When the driver does not respond to the improvement request by the information presentation content control unit X8, the evacuation restriction request unit X7a determines that improvement in the driving posture cannot be expected, and requests the autonomous driving ECU 40 to shift to the MRM control. The information presentation content control unit X8 performs an information presentation event M1 based on the MRM control start determination by the evacuation restriction request unit X7a, and presents, to the driver, information indicating that the driving control has shifted to the MRM control.

After the presentation of the request for replying the presence or absence of the abnormality by the event N2, the information presentation content control unit X8 performs a confirmation determination that the driver is in the difficult-to-drive state when the information presentation content control unit X8 acquires the input information of the user operation of replying that the driver has an abnormality, or when there is no reply from the occupant. The evacuation restriction request unit X7a requests the autonomous driving ECU 40 to shift to the MRM control based on the confirmation determination by the information presentation content control unit X8. As described above, when a driver is seized with a sudden illness or the like, MRM control by the autonomous driving ECU 40 is started. In this case, information presentation content control unit X8 performs the information presentation event M1, and notifies mainly the fellow passenger of the shift to the MRM control.

Further, the occupant monitoring unit X5 of the fifth embodiment illustrated in FIG. 11 grasps the presence or absence of a fellow passenger who is an occupant of the vehicle 1 except for the driver in addition to the presence of the driver. The occupant monitoring unit X5 acquires detection information by the seat sensor 32 provided on a seat face or the like of the passenger seat, and determines whether a fellow passenger is seated on the passenger seat.

When the occupant monitoring unit X5 grasps the presence of the fellow passenger, the information presentation content control unit X8 suspends the presentation of the posture abnormality information based on the premise that the fellow passenger is looking at the state of the driver. That is, even when the driver information acquisition unit X9 acquires the detection result indicating the abnormal state of the driver, the information presentation content control unit X8 does not immediately perform the information presentation of the event N2. As a result, the presentation of the request for replying the presence or absence of the abnormality of the driver enters the standby state.

After the suspension of the presentation of the posture abnormality information, the information presentation content control unit X8 performs the information presentation of the event N2 for causing the presence or absence of the abnormality of the driver to be replied when collapse of a driving posture, which is a factor of the abnormality detection by the deadman function unit Z1, is not improved. That is, the information presentation content control unit X8 cancels the suspension of the presentation of the posture abnormality information based on the continuation of the state in which the improvement in the posture of the driver is not grasped by the driver information acquisition unit X9. Information presentation in this case is performed not only for the driver but also for the fellow passenger in the passenger seat. As in the information presentation when there is no fellow passenger, the fellow passenger in the passenger seat is notified of the reason why it is determined that there is a possibility of abnormality in the driver together with the reply request.

When the driver requirement level is set to any of levels 1 to 3 during the autonomous driving period at level 3, the permissible action determination unit X4 requests the deadman function unit Z1 to relax the criteria for determining that the driver is in the abnormal state based on the determination result of the permissible action. Based on the relaxation request from the permissible action determination unit X4, the deadman function unit Z1 adjusts a threshold value serving as a determination reference so as to make it difficult to determine that the driver is in an abnormal state during the autonomous driving period at level 3. As an example, in a case where it has been determined that the driver is in an abnormal state due to continuation of collapse of a posture for a predetermined time (for example, 5 seconds), the deadman function unit Z1 performs a threshold value adjustment for changing the predetermined time to a longer time (for example, 10 seconds). As described above, the determination criteria by the deadman function unit Z1 is optimized for the autonomous driving at level 3. Note that it is desirable that the determination criteria (threshold value) be relaxed within the scope of laws, regulations, and guidelines related to the deadman device in the country or the region where the vehicle 1 is used.

Figure 12:
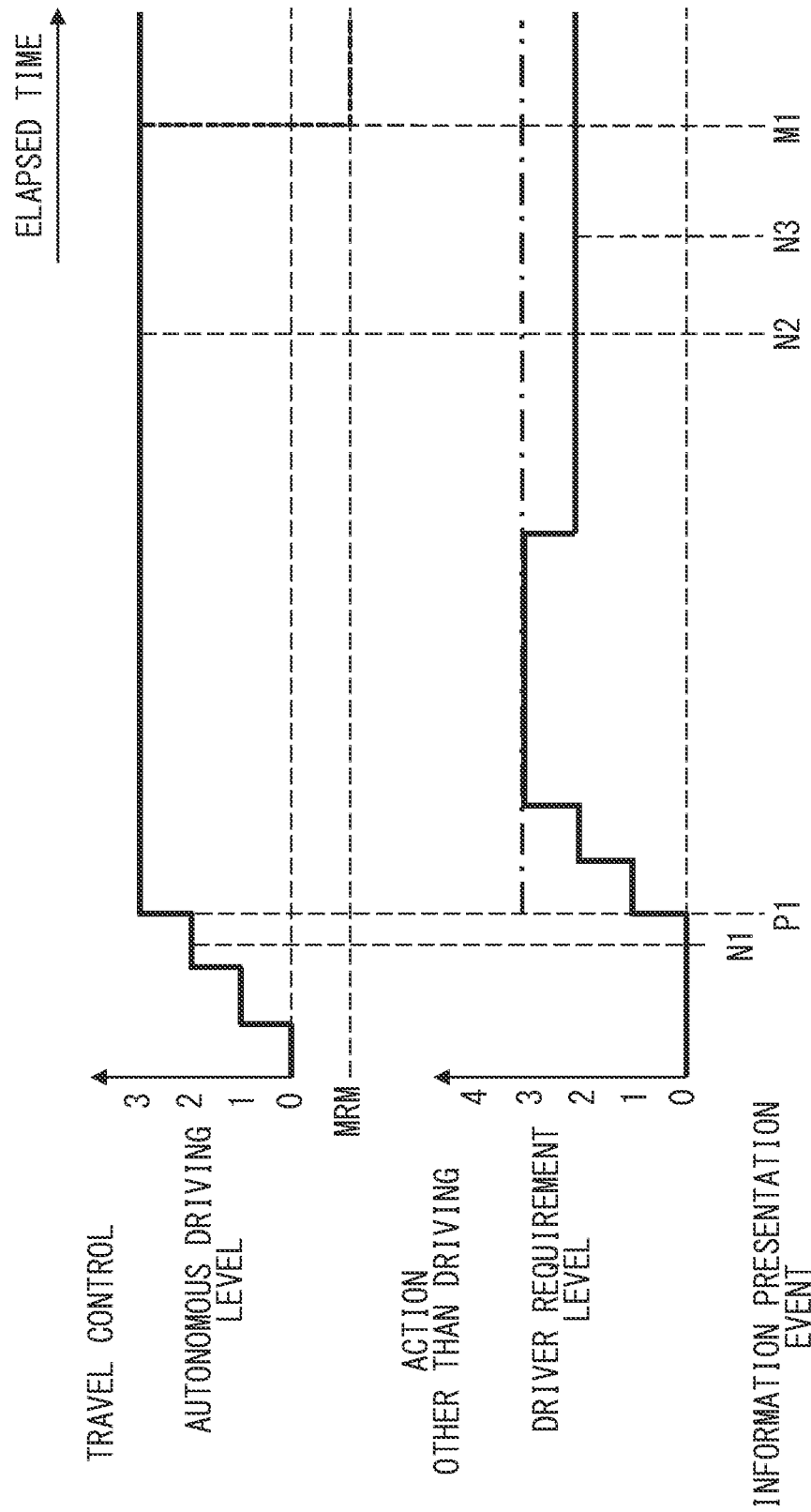
FIG. 12 is a time chart illustrating an example of the operations of the autonomous driving ECU and the HCU.
Figure 13:
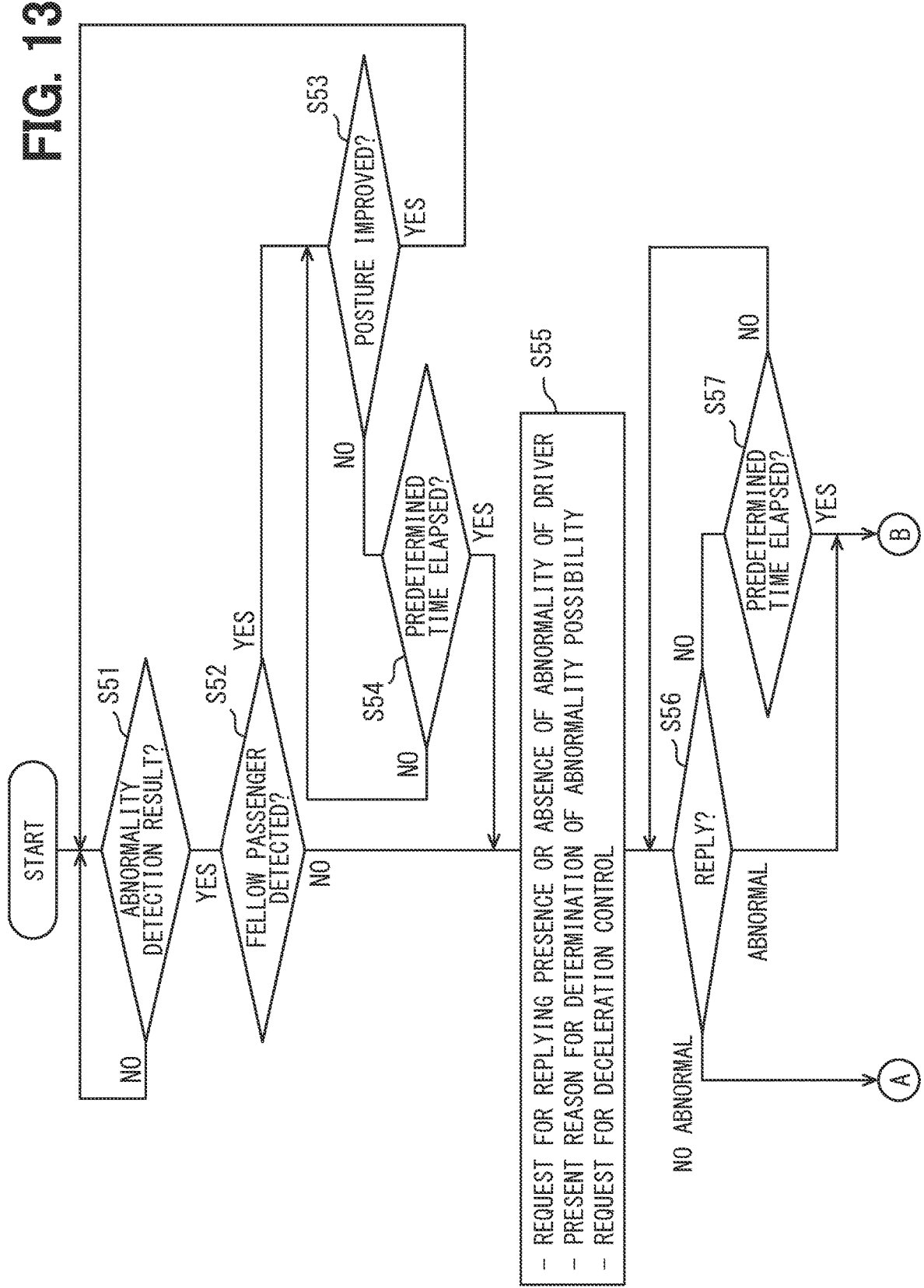
FIG. 13 is a flowchart illustrating information presentation processing by the HCU according to the fifth embodiment together with FIG. 14.
Figure 14:
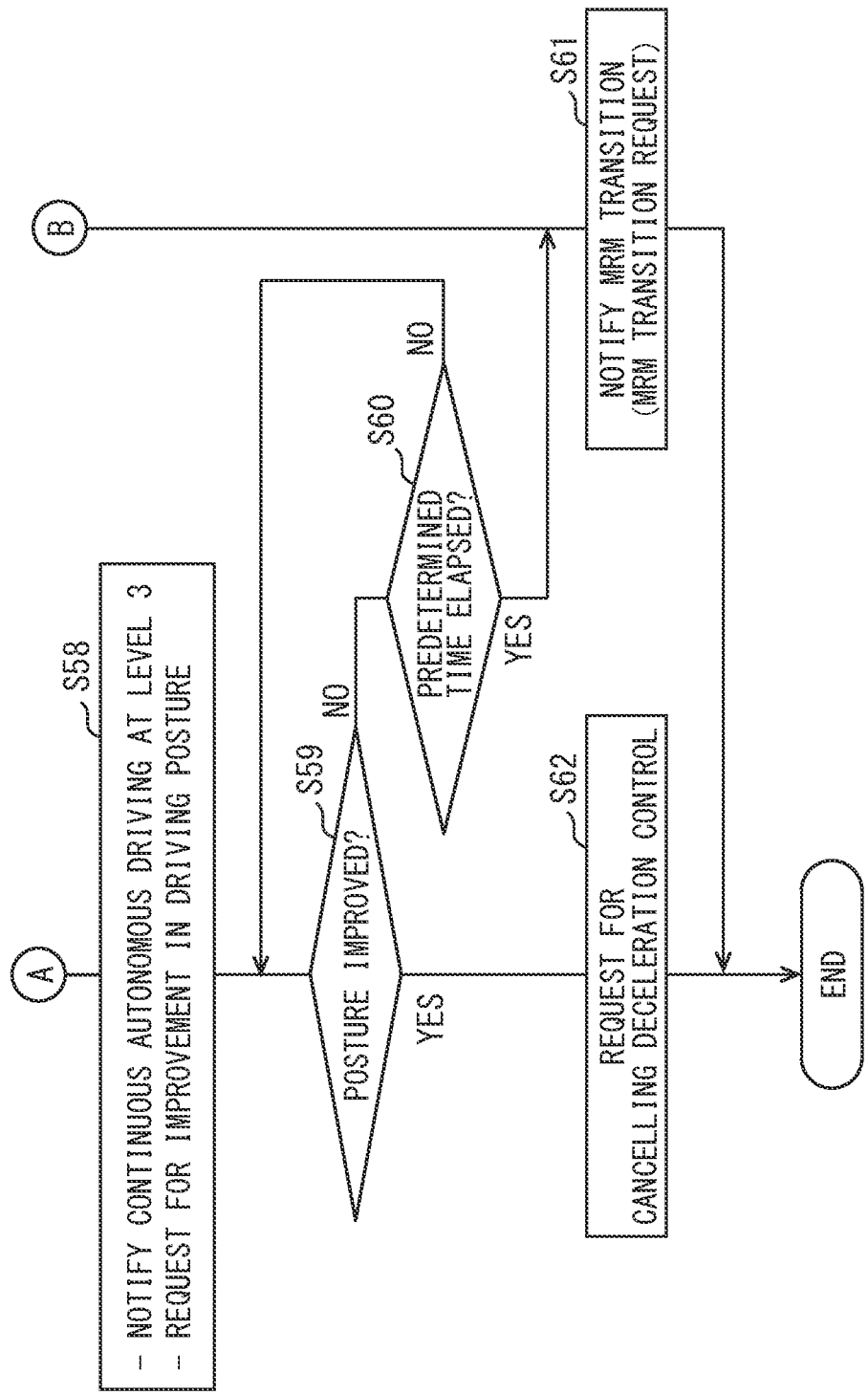
FIG. 14 is a flowchart illustrating information presentation processing by the HCU according to the fifth embodiment together with FIG. 13.

Next, details of the information presentation processing for presenting information about each event related to the deadman described above will be described below based on the flowcharts illustrated in FIGS. 13 and 14 and with reference to FIGS. 11 and 12. The information presentation processing illustrated in FIGS. 13 and 14 is started by the HCU 10 based on the start of the autonomous driving at level 3.

In S51, it is determined whether the driver information acquisition unit X9 has acquired a detection result indicating an abnormal state of the driver. When the detection result indicating the abnormal state is not acquired, the determination of S51 is repeated, and the occurrence of the abnormal state due to the detection of collapse of a posture is waited. On the other hand, when it is determined in S51 that the detection result indicating the abnormal state is acquired, the process proceeds to S52.

In S52, it is determined whether a fellow passenger is present. When it is determined in S52 that the fellow passenger is present, the process proceeds to S55. On the other hand, when it is determined in S52 that no fellow passenger is present, the process proceeds to S53 in order to suspend the information presentation in S55. In S53, it is determined whether improvement in the posture of a driver has been grasped by the deadman function unit Z1 and the driver information acquisition unit X9. When it is determined in S53 that the posture of the driver has been improved, the process returns to S51.

On the other hand, when it is determined in S53 that the posture improvement is not grasped, the process proceeds to S54. In S54, it is determined whether the elapsed time since collapse (abnormal state) of a posture of the driver was detected exceeds a predetermined time. When it is determined in S54 that the predetermined time has not elapsed since collapse of a posture was detected, the process returns to S53. On the other hand, in S54, when it is determined that the predetermined time has elapsed since collapse of a posture was detected, in other words, when it is determined that the state in which the posture of the driver improvement is not grasped has continued for the predetermined time, the process proceeds to S55. As described above, the suspension of the presentation of the posture abnormality information is cancelled.

In S55, the above-described information presentation of the event N2, that is, the presentation of the request for replying the presence or absence of the abnormality of the driver and the presentation of the reason for determining the possibility of an abnormality are performed. In addition, in S55, an execution request for deceleration control of suppressing the set speed is output to the autonomous driving ECU 40. The information presentation of the event N2 and the output of the deceleration control execution request may be performed at different timings. As an example, after the information presentation of the event N2, the deceleration control execution request is output. In such a modification, the occupant senses the deceleration control after being aware of the detection of the abnormal state of the driver. Therefore, the panic of the occupant hardly occurs with respect to the action change in action accompanying the deceleration control. In addition, the information presentation of the event N2 may be performed after the execution request for the speed suppression control.

In S55, a reply result as to whether there is an abnormality in the driver is determined. In S56, in a case where there is a reply that there is no abnormality in the driver and the driver is not in a difficult-to-drive state, the process proceeds to S58. On the other hand, in a case where there is a reply that there is an abnormality in the driver and the driver is in a difficult-to-drive state, the process proceeds to S61. Further, when there is no input of a reply by the occupant, the process proceeds to S57.

In S57, it is determined whether the elapsed time since the reply request was started has exceeded a predetermined time. When it is determined in S57 that the predetermined time has not elapsed since the reply request was started, the process returns to S56. On the other hand, when it is determined in S57 that the predetermined time has elapsed, the process proceeds to S61.

In S58, the presentation of the posture abnormality information by the event N2 that started in S55 is terminated, and the above-described information presentation of the event N3 is performed. Specifically, in S58, the notification indicating the continuation of the autonomous driving at level 3 and the notification for prompting the improvement in the driving posture are sequentially performed, and the process proceeds to S59. The execution order of the autonomous driving continuation notification and the driving posture improvement request may be appropriately switched. In S59, it is determined whether collapse of a posture of the driver has been improved. When it is determined in S59 that collapse of a posture of the driver has been improved, the process proceeds to S62. In S62, release of the functional restriction on the travel control requested in S55, that is, cancellation of the deceleration control is requested to the autonomous driving ECU 40, and the series of processing is terminated.

On the other hand, when it is determined in S59 that collapse of a posture of the driver has not been improved, the process proceeds to S60. In S60, it is determined whether the elapsed time since the driving posture improvement request was started has exceeded a predetermined time. When it is determined in S60 that the predetermined time has not elapsed since the improvement request was started, the process returns to S59. On the other hand, when it is determined in S60 that the predetermined time has elapsed, the process proceeds to S61. In S61, the presentation of the posture abnormality information and the like is ended, and the information presentation of the event W1 described above is performed. Specifically, in S61, the shift of the driving control to the MRM control is notified. Further, in S61, a request for shifting to the MRM control is output to the autonomous driving ECU 40. Thus, the series of processing is ended.

Also in the fifth embodiment described so far, the same effects as those of the first embodiment are obtained, and the driver can obtain information about the determination result of the permissible action, so that the driver can easily take an appropriate action.

In addition, according to the fifth embodiment, the detection result indicating the abnormal state of the driver is acquired by the driver information acquisition unit X9. As a result, even when it is difficult for the driver to perform driving due to a sudden illness or the like during the autonomous driving at level 3, it is possible to reliably shift from the autonomous driving at level 3 to the MRM control.

Further, according to the fifth embodiment, when the detection result indicating collapse of a posture of the driver at the time of the operation of the autonomous driving function at level 3 is acquired, the posture abnormality information is presented to the information presentation device even when the collapsed posture of the driver is within the range permitted as the permissible action. Therefore, even when collapse of a posture due to a sudden illness satisfies the driver requirements during autonomous driving, an inquiry about physical condition can be made to the occupant such as the driver. As a result, it is possible to normally operate the deadman system mainly including the deadman function unit Z1 even during the autonomous driving at level 3.

Furthermore, according to the fifth embodiment, after the occupant is requested to input a reply as to whether the driver is in a difficult-to-drive state, the presentation of the posture abnormality information is terminated when there is a reply to the request for the input. Therefore, after the driver's difficult-to-drive state is confirmed, highly useful information such as the state of MRM control can be presented to the fellow passenger having anxiety in an easy-to-understand manner.

In addition, according to the fifth embodiment, when the detection result indicating collapse of a posture of the driver during the operation of the autonomous driving function at level 3 is acquired, functional restriction is imposed on the travel control even when collapse of a posture of the driver is within a range permitted as a permissible action. Therefore, even when collapse of a posture due to a sudden illness satisfies the driver requirements during autonomous driving, the autonomous driving ECU 40 can shift in advance to a traveling state in which it is easy to shift to the MRM control while continuing the autonomous driving. As a result, when it is really difficult for the driver to perform driving, the transition from the autonomous driving at level 3 to the MRM control can be smoothly performed.

According to the fifth embodiment, when the driver information acquisition unit X9 grasps improvement in a posture of the driver, the autonomous driving ECU 40 is requested to release the functional restriction on the travel control. Therefore, when collapse of a posture of the driver is improved, the traveling state of the vehicle 1 returns to the traveling state by the normal level 3 autonomous driving. Therefore, even in the in-vehicle system in which the deadman system is effective, the convenience of the autonomous driving function is hardly impaired.

Further, according to the fifth embodiment, when the presence of the fellow passenger is grasped, the presentation of the posture abnormality information including the request for replying whether the state is the abnormal state is suspended. Thus, when a fellow passenger is present, the fellow passenger can see the driver. Therefore, it is possible to quickly respond to an unexpected situation occurring in the driver without strictly making notification of collapse of a posture of the driver. According to the above, it is possible to avoid a situation in which the occupant feels annoyed by frequent reply requests.

In addition, according to the fifth embodiment, even when the presence of the fellow passenger is grasped, the suspension of the presentation of the posture abnormality information is cancelled when the state in which the posture of the driver is not improved continues. Therefore, in a case where the driver is seized with a sudden illness and it is difficult for the fellow passenger to handle the case, it is possible to normally operate the deadman system and shift to the MRM control as in the case where there is no fellow passenger.

In addition, according to the fifth embodiment, the permissible action determination unit X4 requests the deadman function unit Z1 to relax the criteria for determining the abnormal state based on the determination result of the permissible action, which is permitted for the driver to take, during the autonomous driving at level 3. According to the adjustment process of the determination criteria, the relaxed posture of the driver during the autonomous driving is hardly erroneously recognized as collapse of a posture due to a sudden illness. As a result, it is possible to avoid a situation in which the occupant feels annoyed by frequent presentations of the reply request.

In the fifth embodiment, the occupant monitoring unit X5 corresponds to an "occupant grasping unit", the evacuation restriction request unit X7a corresponds to a "control request unit", and the deadman function unit Z1 corresponds to an "abnormality detection device".

Other Embodiments

Although a plurality of embodiments have been described above, the present disclosure is not to be construed as being restricted to these embodiments, and can be applied to various embodiments and combinations without departing from the gist of the present disclosure.

Specifically, as a first modification, there may be only one determination viewpoint by the permissible action determination units X4 and Y6.

As a second modification, the permissible action determination units X4 and Y6 may determine a permissible action by using a learned artificial intelligence model constructed mainly by a neural network. For example, it is possible to causing an artificial intelligence model to learn in advance using teacher data including a pair of input data including travel environment information, awakeness level information, and stress information and output data including a determination result of a permissible action corresponding thereto. With such a learned artificial intelligence model, it is possible to comprehensively evaluate a plurality of determination viewpoints without calculating the individual provisional determination result for the plurality of determination viewpoints.

As a third modification, the permissible action determination units X4 and Y6 may not predict the transition of the range of permissible actions in the travel route to the destination based on a determination viewpoint from which the future prediction is possible.

As a fourth modification, for example, the permissible action determination units X4 and Y6 may be configured to predict the transition of the range of permissible actions in the travel route to the destination at the time of start of the operation of the autonomous driving function at the autonomous driving level 3, and then not to determine the permissible action currently permissible to the driver.

As a fifth modification, at least one of the information presentation device 20 and the device to be controlled CE may include a device (for example, a smartphone) brought into the vehicle 1.

As a sixth modification related to the first and second embodiments, the information presentation device 20 may supplementarily include a device that presents tactile information, such as a vibrator that vibrates the driver seat.

In a seventh modification of the fifth embodiment, the presentation of the posture abnormality information is not suspended when the fellow passenger is grasped. In an eighth modification of the fifth embodiment, the process of the permissible action determination unit X4 requesting the deadman function unit Z1 to relax the reference is omitted. Further, in a ninth modification of the fifth embodiment, the presentation of the posture abnormality information to the driver is omitted. In the ninth modification, as the cooperation process between the deadman function unit Z1 and the HCU 10, only a process of the permissible action determination unit X4 requesting the deadman function unit Z1 to relax the reference is performed.

The deadman function unit Z1 according to a tenth modification of the fifth embodiment can use information such as a vehicle behavior and a driving action in addition to the driver state information by the DSM 31 for abnormality detection of the driver. Further, the deadman function unit Z1 according to an eleventh modification is mounted on one independent in-vehicle ECU different from the driving assistance ECU 37 to output a detection result indicating an abnormal state of the driver to the communication bus 99. Further, the deadman function unit Z1 according to a twelfth modification is mounted on a control circuit of the DSM 31 to output a detection result of diagnosing an abnormal state together with the state information about the driver to the communication bus 99.

As a thirteenth modification, the respective functions provided by the HCU 10 and the autonomous driving ECU 40, 340 can be provided by software and hardware for executing the software, only software, only hardware, or a combination thereof. Furthermore, in a case where such functions are provided by an electronic circuit as hardware, each function can also be provided by a digital circuit including a large number of logic circuits or an analog circuit.

As a fourteenth modification, a form of a storage medium (continuous tangible computer reading medium, non-transitory tangible storage medium) that stores a program or the like capable of implementing the above-described information presentation and function control may also be appropriately changed. For example, the storage medium is not limited to the configuration provided on the circuit board, but may be a configuration provided in the form of a memory card or the like, inserted into the slot, and electrically connected to the control circuit of the HCU 10 or the autonomous driving ECU 40, 340. Furthermore, the storage medium may be an optical disk, a hard disk, or the like serving as a copy base of a program to the HCU 10 or the autonomous driving ECU 40, 340.

As a fifteenth modification, the function restriction unit Y7 provided in the autonomous driving ECU 340 in the third embodiment may be provided in the HCU 10 of the first embodiment. The information presentation content control unit X8 provided in the HCU 10 in the first embodiment may be provided in the autonomous driving ECU 340 in the third embodiment. That is, the information presentation and the function restriction using the permissible action determination units X4 and Y6 may be implemented in a complex manner by one electronic control device.

As a sixteenth modification, the information presentation control device may not be mounted on the vehicle 1. For example, when the information presentation control device is the HCU 10, the HCU 10 may not be mounted on the vehicle 1, but may be fixedly disposed outside the vehicle 1, or may be mounted on another vehicle. In the sixteenth modification, the information presentation device 20 is remotely controlled by communication such as the Internet, road-to-vehicle communication, and vehicle-to-vehicle communication. Similarly, the function control device may not be mounted on the vehicle 1.

As a seventeenth modification, the vehicle 1 may be optimized according to the road traffic law of each country and region. Furthermore, the information presented by the information presentation control device and the functions restricted by the function control device may be optimized according to the road traffic law of each country and region.

The control unit and the method thereof described in the present disclosure may be realized by a dedicated computer constituting a processor programmed to execute one or a plurality of functions embodied by a computer program. Alternatively, the device and the method thereof described in the present disclosure may be realized by a dedicated hardware logic circuit. Alternatively, the device and the method thereof described in the present disclosure may be realized by one or more dedicated computers configured by a combination of a processor that executes a computer program and one or more hardware logic circuits. Furthermore, the computer program may be stored in a computer-readable non-transition tangible recording medium as an instruction executed by a computer.

What is claimed is:

1. An information presentation control device for a vehicle having an autonomous driving function to perform a driving action on behalf of a driver and configured to control an information presentation device that is configured to present information to the driver, the information presentation control device comprising:
    a permissible action determination unit configured to determine a permissible action, which is permitted for the driver, among actions other than driving, different from the driving action, and to be possibly taken by the driver when the autonomous driving function is implemented; and
    an information presentation content control unit configured to cause the information presentation device to present information about a determination result of the permissible action, wherein
    the permissible action determination unit is configured to determine the permissible action based on a stress of the driver; and
    the permissible action determination unit is configured to determine the permissible action based on a determination index, in which the action other than driving is associated with a level of permission of the permissible action according to a reclining angle of a driver seat in the action other than driving.

2. The information presentation control device according to claim 1, wherein
    the permissible action determination unit is configured to determine the permissible action based on a determination index, in which the action other than driving is associated with a level of permission of the permissible action according to a posture of the driver in the action other than driving.

3. An information presentation control device for a vehicle having an autonomous driving function to perform a driving action on behalf of a driver and configured to control an information presentation device that is configured to present information to the driver, the information presentation control device comprising:
    a permissible action determination unit configured to determine a permissible action, which is permitted for the driver, among actions other than driving, different from the driving action, and to be possibly taken by the driver when the autonomous driving function is implemented; and
    an information presentation content control unit configured to cause the information presentation device to present information about a determination result of the permissible action, wherein the permissible action determination unit is configured to determine the permissible action based on a determination index, in which the action other than driving is associated with a level of permission of the permissible action according to a posture of the driver in the action other than driving; and the permissible action determination unit is configured to determine the permissible action based on a determination index, in which the action other than driving is associated with a level of permission of the permissible action according to a posture of the driver in the action other than driving.

4. An information presentation control device for a vehicle having an autonomous driving function to perform a driving action on behalf of a driver and configured to control an information presentation device that is configured to present information to the driver, the information presentation control device comprising:

a permissible action determination unit configured to determine a permissible action, which is permitted for the driver, among actions other than driving, different from the driving action, and to be possibly taken by the driver when the autonomous driving function is implemented; and an information presentation content control unit configured to cause the information presentation device to present information about a determination result of the permissible action, wherein the permissible action determination unit is configured to determine the permissible action based on a determination index, in which the action other than driving is associated with a level of permission of the permissible action according to a reclining angle of a driver seat in the action other than driving.

5. The information presentation control device according to claim 1, wherein on estimation that the driver is taking an action, which is other than the permissible action, among the actions other than driving, the information presentation content control unit is configured to cause the information presentation device to present a piece of advice for shifting the action, which is other than the permissible action taken by the driver, to the permissible action.

6. An information presentation control device for a vehicle having an autonomous driving function to perform a driving action on behalf of a driver and configured to control an information presentation device that is configured to present information to the driver, the information presentation control device comprising:

a permissible action determination unit configured to determine a permissible action, which is permitted for the driver, among actions other than driving, different from the driving action, and to be possibly taken by the driver when the autonomous driving function is implemented; and an information presentation content control unit configured to cause the information presentation device to present information about a determination result of the permissible action, wherein on estimation that the driver is taking an action, which is other than the permissible action, among the actions other than driving, the information presentation content control unit is configured to cause the information presentation device to present a piece of advice for shifting the action, which is other than the permissible action taken by the driver, to the permissible action; and on estimation that the driver is taking the permissible action among the actions other than driving, the information presentation content control unit is configured to cause the information presentation device to present information about the determination result of the permissible action, after a restriction time period, which is set to restrict a frequency of an information presentation, elapses.

7. The information presentation control device according to claim 1, further comprising:

a driver information acquisition unit configured to acquire a detection result, which indicates an abnormal state of the driver, from an abnormality detection device, which is configured to detect the driver having difficulty in driving.

8. The information presentation control device according to claim 7, wherein on acquisition of the detection result, which indicates collapse of a posture of the driver, when the autonomous driving function is implemented, the information presentation content control unit is configured to cause the information presentation device to present posture abnormality information about the collapse of the posture of the driver, even when a collapsed posture of the driver is within a range permitted as the permissible action.

9. The information presentation control device according to claim 8, further comprising:

an occupant grasping unit configured to grasp presence or absence of a fellow passenger who is an occupant of the vehicle except the driver, wherein the information presentation content control unit is configured to suspend presentation of the posture abnormality information when the occupant grasping unit grasps presence of the fellow passenger.

10. An information presentation control device for a vehicle having an autonomous driving function to perform a driving action on behalf of a driver and configured to control an information presentation device that is configured to present information to the driver, the information presentation control device comprising:

a permissible action determination unit configured to determine a permissible action, which is permitted for the driver, among actions other than driving, different from the driving action, and to be possibly taken by the driver when the autonomous driving function is implemented;

an occupant grasping unit configured to grasp presence or absence of a fellow passenger who is an occupant of the vehicle except the driver; and an information presentation content control unit configured to cause the information presentation device to present information about a determination result of the permissible action, wherein a driver information acquisition unit configured to acquire a detection result, which indicates an abnormal state of the driver, from an abnormality detection device, which is configured to detect the driver having difficulty in driving, on acquisition of the detection result, which indicates collapse of a posture of the driver, when the autonomous driving function is implemented, the information presentation content control unit is configured to cause the information presentation device to present posture abnormality information about the collapse of the posture of the driver, even when a collapsed posture of the driver is within a range permitted as the permissible action, and the information presentation content control unit is configured to suspend presentation of the posture abnormality information when the occupant grasping unit grasps presence of the fellow passenger.

11. The information presentation control device according to claim 9, wherein the information presentation content control unit is configured to cancel suspension of presentation of the posture abnormality information when a state, in which the driver information acquisition unit does not grasp improvement in a posture of the driver, continues.

12. The information presentation control device according to claim 8, wherein the information presentation content control unit is configured to request an occupant of the vehicle, by presenting the posture abnormality information, to input a reply, which indicates whether a state is a difficult-to-drive state, and terminate the presentation of the posture abnormality information in response to a reply to an input request.

13. The information presentation control device according to claim 8, further comprising:

a restriction request unit configured to request to impose a functional restriction on travel control by the autonomous driving function, on acquisition of the detection result indicating collapse of a posture of the driver when the autonomous driving function is implemented, even when the collapsed posture of the driver is within a range permitted as the permissible action.

14. The information presentation control device according to claim 13, wherein the restriction request unit is configured to request the autonomous driving function to release a functional restriction on the travel control on grasping improvement in a posture of the driver by the driver information acquisition unit.

15. The information presentation control device according to claim 7, wherein the permissible action determination unit is configured to request the abnormality detection device to relax a criteria for determining collapse of a posture of the driver based on the determination result of the permissible action.

16. An information presentation control device for a vehicle having an autonomous driving function to perform a driving action on behalf of a driver and configured to control an information presentation device that is configured to present information to the driver, the information presentation control device comprising:

a permissible action determination unit configured to determine a permissible action, which is permitted for the driver, among actions other than driving, different from the driving action, and to be possibly taken by the driver when the autonomous driving function is implemented; and an information presentation content control unit configured to cause the information presentation device to present information about a determination result of the permissible action, wherein a driver information acquisition unit configured to acquire a detection result, which indicates an abnormal state of the driver, from an abnormality detection device, which is configured to detect the driver having difficulty in driving, and the permissible action determination unit is configured to request the abnormality detection device to relax a criteria for determining collapse of a posture of the driver based on the determination result of the permissible action.

17. An information presentation control device for a vehicle having an autonomous driving function to perform a driving action on behalf of a driver and configured to control an information presentation device that is configured to present information to the driver, the information presentation control device comprising:

a permissible action determination unit configured to determine a permissible action, which is permitted for the driver, among actions other than driving, different from the driving action, and to be possibly taken by the driver when the autonomous driving function is implemented; and an information presentation content control unit configured to cause the information presentation device to present information about a determination result of the permissible action, wherein on estimation that the driver is taking the permissible action among the actions other than driving, the information presentation content control unit is configured to cause the information presentation device to present information about the determination result of the permissible action, after a restriction time period, which is set to restrict a frequency of an information presentation, elapses.

18. The information presentation control device according to claim 1, wherein in a case where a range of the permissible action determined by the permissible action determination unit has changed, the information presentation content control unit is configured to cause the information presentation device to present information indicating a change in the range of the permissible action.

19. The information presentation control device according to claim 1, wherein the permissible action determination unit is capable of updating the determination result of the permissible action based on latest information while the autonomous driving function is implemented, and in a case where a range of the permissible action determined by the permissible action determination unit has changed, the information presentation content control unit is configured to cause the information presentation device to tone up an information presentation as an amount of change in the range of the permissible action increases.

20. The information presentation control device according to claim 1, wherein the permissible action determination unit is configured to estimate a continuous operation section, in which the autonomous driving function is scheduled to be continuously implemented, and a point at which a level of permission of the determination result of the permissible action is lowest within the continuous operation section, and the information presentation content control unit is configured to cause the information presentation device to present information about the determination result for the point while the autonomous driving function is actually implemented in association with the continuous operation section.

21. The information presentation control device according to claim 1, wherein
the information presentation content control unit is configured to cause the information presentation device to present information indicating the permissible action among the actions other than driving.

22. The information presentation control device according to claim 1, wherein
the information presentation content control unit is configured to cause the information presentation device to present information indicating an action, which is other than the permissible action, among the actions other than driving.

23. The information presentation control device according to claim 1, wherein
the permissible action determination unit is configured to determine the permissible action based on a travel environment.

24. The information presentation control device according to claim 23, wherein
the permissible action determination unit is configured to determine the permissible action based on, as the travel environment, a shape of a road, on which the vehicle travels.

25. The information presentation control device according to claim 24, wherein
in a case where a road, on which the vehicle travels, has a curve shape and where a length of a curve section exceeds a predetermined distance, the permissible action determination unit is configured to narrow a range, in which an action is determined to be the permissible action.

26. The information presentation control device according to claim 23, wherein
the permissible action determination unit is configured to determine the permissible action based on, as the travel environment, a traveling scene of the vehicle.

27. The information presentation control device according to claim 1, wherein
the permissible action determination unit is configured to determine the permissible action based on an awakeness level of the driver.

28. The information presentation control device according to claim 1, wherein
the permissible action determination unit is configured to set a plurality of determination viewpoints,
temporarily determinate an individual permissible action for each of the determination viewpoints, and
definitely determine, as the permissible action, an action, which is determined to be the permissible action in common between the determination viewpoints, among individual permissible actions, which includes the individual permissible action, for the determination viewpoints.

29. The information presentation control device according to claim 1, wherein
in a case where a functional restriction to implementation of the permissible action using the information presentation device is imposed on the information presentation device, the information presentation content control unit is configured to make a request to release the restriction.

30. The information presentation control device according to claim 1, wherein
the information presentation device includes a device, which is configured to present visual information, and a device, which is configured to present auditory information, and
the information presentation content control unit is configured to select a device to be used for information presentation from the device, which is configured to present the visual information, and the device, which is configured to present the auditory information, according to the action, which is other than driving and estimated to be currently taken by the driver.

31. The information presentation control device according to claim 1, wherein
on estimation that the driver is taking an action, which is other than the permissible action, among the actions other than driving, the information presentation content control unit is configured to cause the information presentation device to present a reason why the driver is not permitted to take the action other than the permissible action.

32. The information presentation control device according to claim 1, wherein
on estimation that the driver is continuously performing an action, which is other than the permissible action, among the actions other than driving, the information presentation content control unit is configured to cause the information presentation device to issue an alarm directed to the driver.

33. The information presentation control device according to claim 32, further comprising:
an evacuation request unit configured to make a request to the vehicle to forcibly evacuate, on estimation that the driver is further continuously performing an action, which is other than the permissible action, among the actions other than driving, after the alarm starts to be issued.

34. The information presentation control device according to claim 32, wherein
the information presentation content control unit is configured to cause the information presentation device to present a notice to switch a driving-mode to end the autonomous driving function together with issuing the alarm.

35. The information presentation control device according to claim 1, wherein
the information presentation content control unit is configured to cause the information presentation device to present a notice to switch a driving-mode to end the autonomous driving function on grasping an end schedule of a permitted area in which the actions other than driving is permitted.

36. The information presentation control device according to claim 34, wherein
the permissible action determination unit is configured to narrow a range, in which an action is determined to be the permissible action, to a predetermined switch preparation range in a switch preparation section before a driving-mode is switched from the autonomous driving function to the driver.

37. A function control device for a vehicle having an autonomous driving function to perform a driving action on behalf of a driver and configured to control a function of a device to be controlled, the function control device comprising:
a permissible action determination unit configured to determine a permissible action, which is permitted for the driver, among actions other than driving, different from the driving action, and to be possibly taken by the driver when the autonomous driving function is implemented; and a function restriction unit configured to restrict a function of the device to be controlled, which enables to implement an action, which is other than the permissible action, among the actions other than driving, wherein the device to be controlled includes a driver seat configured such that the driver sits on, and the function restriction unit is configured to restrict, according to a determination result of the permissible action, an angle at which the driver seat is permitted to be reclined.

38. The function control device according to claim 37, wherein the device to be controlled includes a display configured to perform display for the driver, and the function restriction unit is configured to restrict a display content of the display according to a determination result of the permissible action.

39. The function control device according to claim 37, wherein the device to be controlled includes a speaker configured to output sound toward the driver, and the function restriction unit is configured to restrict a volume of the speaker according to a determination result of the permissible action.

40. The information presentation control device according to claim 3, wherein the determination index is an index obtained by dividing a plurality of actions stepwise, and the permissible action determination unit is configured to extract a determination result of one of the permissible actions having a lowest level of permission.

* * * * *